(12) United States Patent
Routley et al.

(10) Patent No.: US 10,809,840 B2
(45) Date of Patent: Oct. 20, 2020

(54) PRESSURE SENSING APPARATUS AND METHOD

(71) Applicant: Cambridge Touch Technologies Ltd., Cambridge (GB)

(72) Inventors: Paul Routley, Cambridge (GB); Babak Bastani, Royston (GB); Riccardo Micci, Cambridge (GB); Arokia Nathan, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

(21) Appl. No.: 16/430,549

(22) Filed: Jun. 4, 2019

(65) Prior Publication Data

US 2019/0377469 A1 Dec. 12, 2019

(30) Foreign Application Priority Data

Jun. 6, 2018 (GB) .................................. 1809318.7

(51) Int. Cl.
*G06F 3/041* (2006.01)
*G01L 1/16* (2006.01)
(Continued)

(52) U.S. Cl.
CPC .......... *G06F 3/04144* (2019.05); *G01L 1/16* (2013.01); *G01L 1/26* (2013.01); *G06F 3/0418* (2013.01);
(Continued)

(58) Field of Classification Search
CPC ................... G06F 3/0414; G06F 3/044; G06F 2203/04105; G06F 3/04144
See application file for complete search history.

(56) References Cited

U.S. PATENT DOCUMENTS 9,690,408 B1   6/2017   Krah
10,254,894 B2  4/2019   Nathan et al.
(Continued)

FOREIGN PATENT DOCUMENTS

EP    2902886 A1   8/2015
GB    2138567 A   10/1984
(Continued)

OTHER PUBLICATIONS

Extended European Search Report in EPO application EP 19177643.4, dated Oct. 30, 2019, 10 pages.
(Continued)

*Primary Examiner* — Gerald Johnson

(57) ABSTRACT

Apparatus (22) for processing signals from a touch panel (10) is described. The touch panel (10) includes a layer of piezoelectric material (16) disposed between a plurality of sensing electrodes (14, 20) and at least one common electrode (15). The apparatus (22) includes a first circuit (23) for connection to the plurality of sensing electrodes (14, 20). The first circuit (23) is configured to generate a plurality of first pressure signals (29). Each first pressure signal (29) corresponds to one or more sensing electrodes (14, 20) and is indicative of a pressure acting on the touch panel (10) proximate to the corresponding one or more sensing electrodes (14, 20). The apparatus (22) also includes a second circuit (24) for connection to the at least one common electrode (15). The second circuit (24) is configured to generate a second pressure signal (30) indicative of a total pressure applied to the touch panel (10). The apparatus (22) also includes a controller (25) configured to determine an external interference signal (32) based on a weighted sum over the second pressure signal (30) and the plurality of first pressure signals (29). The controller (25) is also configured to compare the external interference signal (32) against a pre-calibrated threshold ($V_{thresh}$). The controller is also (Continued)

configured, in response to the external interference signal (32) being greater than or equal to the pre-calibrated threshold ($V_{thresh}$), to output an interference flag ($Int_{flag}$) indicating that the first and second pressure signals (29, 30) are influenced by coupling to one or more external electrical fields.

14 Claims, 12 Drawing Sheets

(51) Int. Cl.
    *G01L 1/26*     (2006.01)
    *G06F 3/044*     (2006.01)
    *G01L 1/14*     (2006.01)

(52) U.S. Cl.
    CPC ........ *G06F 3/0446* (2019.05); *G06F 3/04146* (2019.05); *G01L 1/142* (2013.01); *G06F 3/044* (2013.01); *G06F 2203/04106* (2013.01)

(56) References Cited

U.S. PATENT DOCUMENTS

| | | | |
|---|---|---|---|
| 10,282,046 | B2 | 5/2019 | Nathan et al. |
| 10,310,659 | B2 | 6/2019 | Nathan et al. |
| 10,318,038 | B2 | 6/2019 | Nathan et al. |
| 2010/0079384 | A1 | 4/2010 | Grivna et al. |
| 2012/0120017 | A1 | 5/2012 | Worfolk et al. |
| 2013/0033451 | A1 | 2/2013 | Olsen |
| 2013/0076646 | A1 | 3/2013 | Krah et al. |
| 2014/0043289 | A1 | 2/2014 | Stern |
| 2014/0292699 | A1 | 10/2014 | Ando |
| 2014/0362304 | A1* | 12/2014 | Wang ............. G06F 3/0412 349/12 |
| 2015/0077402 | A1* | 3/2015 | Ye ............. G06F 3/0418 345/178 |
| 2015/0103042 | A1 | 4/2015 | Lee et al. |
| 2015/0153900 | A1 | 6/2015 | Chang et al. |
| 2016/0098131 | A1 | 4/2016 | Ogata et al. |
| 2016/0179276 | A1 | 6/2016 | Nathan et al. |
| 2016/0259465 | A1 | 9/2016 | Agarwal et al. |
| 2016/0282999 | A1 | 9/2016 | Hwang et al. |
| 2017/0199624 | A1 | 7/2017 | Nathan et al. |
| 2017/0235410 | A1* | 8/2017 | Costa ............. G06F 3/044 345/174 |
| 2017/0242507 | A1* | 8/2017 | Chang ............. G06F 3/044 |
| 2017/0262099 | A1 | 9/2017 | Nathan et al. |
| 2018/0045586 | A1 | 2/2018 | kawamura et al. |
| 2018/0081466 | A1* | 3/2018 | Moon ............. H01L 41/1132 |
| 2018/0095574 | A1* | 4/2018 | Kim ............. G06F 3/0412 |
| 2018/0097041 | A1* | 4/2018 | Ito ............. H01L 51/0097 |
| 2019/0034021 | A1 | 1/2019 | Zhao et al. |
| 2019/0377452 | A1 | 12/2019 | Routley et al. |
| 2019/0377468 | A1 | 12/2019 | Micci et al. |
| 2020/0159381 | A1* | 5/2020 | Ban ............. H01L 41/047 |

FOREIGN PATENT DOCUMENTS

| | | | |
|---|---|---|---|
| GB | 2544353 | A1 | 5/2017 |
| JP | 2015097068 | A | 5/2015 |
| WO | 2006135483 | A2 | 12/2006 |
| WO | 2009150498 | A2 | 12/2009 |
| WO | 2012031564 | A1 | 3/2012 |
| WO | 2015046289 | A1 | 4/2015 |
| WO | 2016102975 | A2 | 6/2016 |
| WO | 2016199626 | A1 | 12/2016 |
| WO | 2017109455 | A1 | 6/2017 |
| WO | 2017122466 | A1 | 7/2017 |

OTHER PUBLICATIONS

Combined Search and Examination Report under Sections 17 and 18(3) for UK application No. GB1809318.7 dated Dec. 21, 2018, 5 pages.

Extended European Search Report in EPO application EP 19177653.3, dated Oct. 30, 2019, 9 pages.

International Search Report and Written Opinion dated Jul. 23, 2019, directed to International application No. PCT/GB2019/051400.

International Search Report and Written Opinion, dated Jul. 23, 2019, directed to International application No. PCT/GB2019/051567.

International Search Report and Written Opinion, dated Jul. 23, 2019, directed to International application No. PCT/GB2019/051568.

International Search Report and Written Opinion, dated Sep. 5, 2019, directed to International application No. PCT/GB2019/051605.

Combined Search and Examination Report under Sections 17 and 18(3) for UK application No. GB1809320.3 dated Dec. 21, 2018, 5 pages.

Combined Search and Examination Report under Sections 17 and 18(3) for UK application No. GB1815617.4 dated Mar. 14, 2019, 7 pages.

Notice of Allowance in U.S. Appl. No. 16/430,044, USPTO, dated Mar. 30, 2020, 8 pages.

Routley, U.S. Appl. No. 16/939,252, filed Jul. 27, 2020, 50 pages.

* cited by examiner

PRESSURE SENSING APPARATUS AND METHOD

CROSS-REFERENCE TO RELATED APPLICATIONS

This application is based upon, and claims the benefit of priority from United Kingdom Patent Application No. GB1809318.7, filed on Jun. 6, 2018, the entire contents of which are hereby incorporated by reference.

FIELD OF THE INVENTION

The present invention relates to apparatus and methods for processing signals from a pressure-sensing touch panel, and to touch panel systems using the apparatus and method.

BACKGROUND

Resistive and capacitive touch panels are used as input devices for computers and mobile devices. One type of capacitive touch panel, projected capacitance touch panels, is often used for mobile devices. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel which can sense pressure can allow a user to interact with a device in new ways by providing additional information about user interaction(s) with the touch panel.

WO 2016/102975 A2 describes apparatus and methods for combined capacitance and pressure sensing in which a single signal is amplified then subsequently separated into pressure and capacitance components. WO 2017/109455 A1 describes apparatus and methods for combined capacitance and pressure sensing in which a single signal is separated into a capacitance signal, and a pressure signal which is amplified.

SUMMARY

According to a first aspect of the invention, there is provided apparatus for processing signals from a touch panel. The touch panel includes a layer of piezoelectric material disposed between a plurality of sensing electrodes and at least one common electrode. The apparatus includes a first circuit for connection to the plurality of sensing electrodes. The first circuit is configured to generate a plurality of first pressure signals. Each first pressure signal corresponds to one or more sensing electrodes and is indicative of a pressure acting on the touch panel proximate to the corresponding one or more sensing electrodes. The apparatus also includes a second circuit for connection to the at least one common electrode. The second circuit is configured to generate a second pressure signal indicative of a total pressure applied to the touch panel. The apparatus also includes a controller configured to determine an external interference signal based on a weighted sum over the second pressure signal and the plurality of first pressure signals. The controller is also configured to compare the external interference signal against a pre-calibrated threshold. The controller is also configured, in response to the external interference signal being greater than or equal to the pre-calibrated threshold, to output an interference flag indicating that the first and second pressure signals are influenced by coupling to one or more external electrical fields.

Each sensing electrode may contribute to a single first pressure signal.

The controller may be further configured to determine a location at which pressure is applied to the touch panel. In response to the interference flag being set, the controller may be configured to process the first and/or second pressure signals using a signal post-processing method configured to reduce or remove the influence of coupling to one or more external electrical fields.

Processing the first and/or second pressure signals using a signal post-processing method configured to reduce or remove the influence of coupling to one or more external electrical fields may include identifying one or more sensing electrodes which are proximate to the location, and excluding the identified sensing electrodes from calculations to determine the total pressure.

The controller may be further configured to estimate one or more pressures acting on the touch panel proximate to the one or more excluded sensing electrodes, based on the remaining non-excluded sensing electrodes.

The first circuit may be configured to generate, for each sensing electrode, a capacitance signal indicative of a capacitance of the sensing electrode. The controller may be configured to determine a location at which pressure is applied to the touch panel based on the capacitance signals.

Generating the first pressure signals and the capacitance signals may include separating single signals received from the sensing electrodes.

Each first pressure signal may correspond to a single sensing electrode.

A touch panel system may include the apparatus, and a touch panel including a layer of piezoelectric material disposed between a plurality of sensing electrodes and at least one common electrode.

An electronic device may include the touch panel system.

According to a second aspect of the invention, there is provided a method of processing signals from a touch panel. The touch panel includes a layer of piezoelectric material disposed between a plurality of sensing electrodes and at least one common electrode. The method includes generating a plurality of first pressure signals. Each first pressure signal is based on signals received from one or more sensing electrodes. Each first pressure signal is indicative of a pressure acting on the touch panel proximate to the corresponding one or more sensing electrodes. The method may also include generating, based on signals received from the at least one common electrode, a second pressure signal indicative of a total pressure applied to the touch panel. The method may also include determining an external interference signal based on a weighted sum over the second pressure signal and the plurality of first pressure signals. The method may also include comparing the external interference signal against a pre-calibrated threshold. The method may also include, in response to the external interference signal being greater than or equal to the pre-calibrated threshold, outputting an interference flag indicating that the first and second pressure signals are influenced by coupling to one or more external electrical fields.

The method may also include determining a location at which pressure is applied to the touch panel, and in response to the interference flag being set, processing the first and/or second pressure signals using a signal post-processing method configured to reduce or remove the influence of coupling to one or more external electrical fields.

Processing the first and/or second pressure signals using a signal post-processing method configured to reduce or remove the influence of coupling to one or more external electrical fields may include identifying one or more sensing electrodes which are proximate to the location, and excluding the identified sensing electrodes from subsequent calculations to determine the total pressure.

The method may also include estimating one or more pressures acting on the touch panel proximate to the one or more excluded sensing electrodes, based on the remaining non-excluded sensing electrodes.

The method may also include generating, based on signals received from each sensing electrode, a capacitance signal indicative of a capacitance of the sensing electrode. The method may also include determining a location at which pressure is applied to the touch panel based on the capacitance signals.

Generating the first pressure signals and the capacitance signals may include separating single signals received from the sensing electrodes.

Each first pressure signal may correspond to a single sensing electrode.

BRIEF DESCRIPTION OF THE DRAWINGS

Certain embodiments of the present invention will now be described, by way of Example, with reference to the accompanying drawings in which.

DETAILED DESCRIPTION

Figure 1:
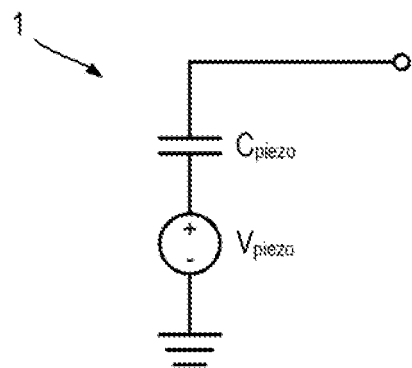
FIG. 1 is an equivalent circuit diagram of a piezoelectric sensor.

In the following description, like parts are denoted by like reference numerals.

In some circumstances, a variety of unwanted signals may couple via a user's digit or conductive stylus to the sensing electrodes of a piezoelectric pressure sensing touch panel or a combined capacitance and piezoelectric pressure sensing touch panel. Such signals may be amplified along with the desired piezoelectric pressure signals, and may be of comparable or larger amplitude than piezoelectric pressure signals. For example a user's digit placed on a piezoelectric pressure sensing touch panel or a combined capacitance and piezoelectric pressure sensing touch panel sensor may couple mains interference into the sensing electrodes. Additionally or alternatively, a user may become charged with static electricity, which may couple to the sensing electrodes of a piezoelectric pressure sensing touch panel or a combined capacitance and piezoelectric pressure sensing touch panel. It is possible to employ signal post-processing methods intended to reduce or remove the effects of such unwanted signals. However, in order to avoid removing or reducing real signals, it is important to be able to detect the occurrence of unwanted signals. In this specification, methods for simply and reliably detecting the presence and/or extent of such unwanted interference shall be described.

Piezoelectric sensors are two electrode devices with a typically high output impedance at low frequencies, which may cause piezoelectric sensors to become vulnerable to picking up interference from external electric fields. The desired signals generated on the two electrodes of a piezoelectric sensor due to mechanical strain are of opposite polarity. By contrast, interference due to coupling to external electric fields will be of the same polarity on both electrodes. The present specification describes methods and apparatus for combining the signals from electrodes arranged on opposite sides of a layer of piezoelectric material, so that interference from coupling to external electrical fields may be more reliably detected. Reliable detection of the presence of interference from coupling to external electrical fields may enable accurate application of signal post-processing methods intended to reduce or remove such interference.

Piezoelectric sensing: Referring to FIG. 1, an equivalent circuit of a piezoelectric sensor 1 is shown.

A piezoelectric sensor 1 may be modelled as a voltage source, $V_{piezo}$, in series with a capacitor, $C_{piezo}$. The capacitance $C_{piezo}$ represents the capacitance between first and second electrodes which are arranged with piezoelectric material between them. The voltage source $V_{piezo}$ represents an open circuit voltage generated across the capacitance $C_{piezo}$ when a force is applied to the piezoelectric sensor 1.

Figure 2:
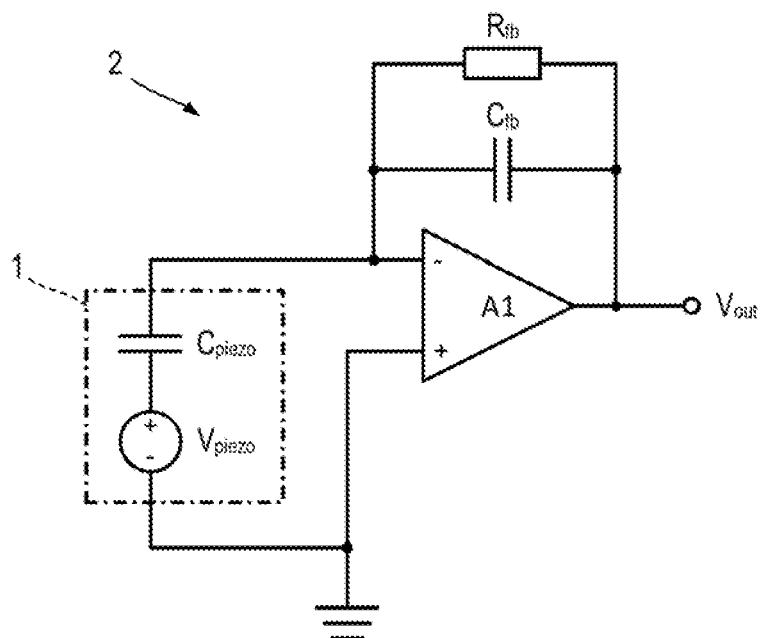
FIG. 2 is a circuit diagram of a first measurement circuit.

Referring also to FIG. 2, a first example of a measurement circuit 2 is shown.

The first measurement circuit 2 includes a single-ended amplifier A1 having inputs connected across the piezoelectric sensor 1 and a feedback network in the form of a resistor $R_{fb}$, and capacitor $C_{fb}$, connected in parallel across the output and the inverting input of the amplifier A1. In practice, the first measurement circuit 2 may include further passive components, switches for resetting the feedback network, and so forth. Depending upon the specific configuration used, the first measurement circuit 2 may measure a voltage, a current, a charge or a combination thereof.

Figure 3:
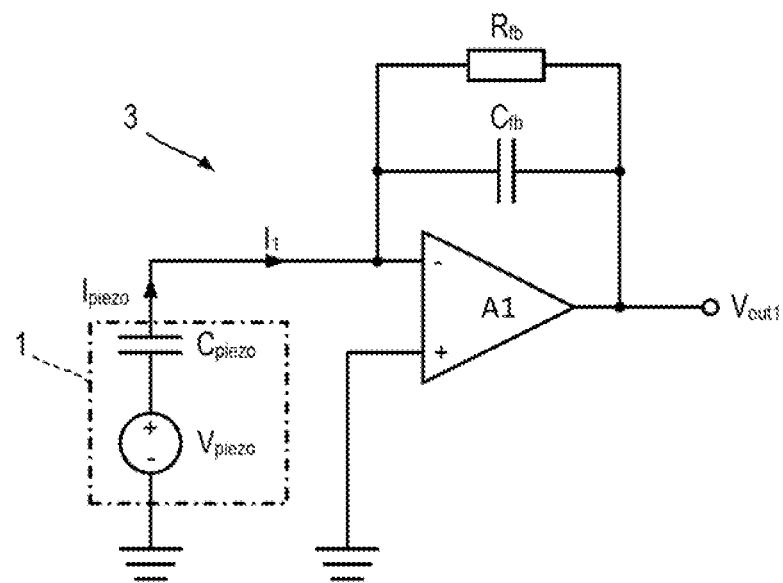
FIG. 3 is a circuit diagram of a second measurement circuit.

Referring also to FIG. 3, a second example of a measurement circuit 3 is shown.

The second measurement circuit 3 is the same as the first measurement circuit, except that the non-inverting input of the single-ended amplifier A1 is grounded, rather than connected to an electrode of the piezoelectric sensor 1. In this way, the second measurement circuit 3 measures the current $I_1$ flowing into the inverting input which is at ground potential. This configuration of the second measurement circuit may reduce or eliminate the effect of parasitic capacitances. In ideal circumstances, the measured current $I_1$ is substantially equal to an induced piezoelectric current signal $I_{piezo}$, i.e. $I_1 \approx I_{piezo}$. Typically, the second measurement circuit 3 is configured to integrate the current signal $I_1$ in order to provide on the output $V_{out1}$ a charge signal corresponding to a charge $Q_{piezo}$ induced across the piezoelectric sensor 1. In other words, $V_{out1}$ is functionally related to the piezoelectric charge $Q_{piezo}$, which in turn is functionally related to a force applied to the piezoelectric sensor 1.

Figure 4:
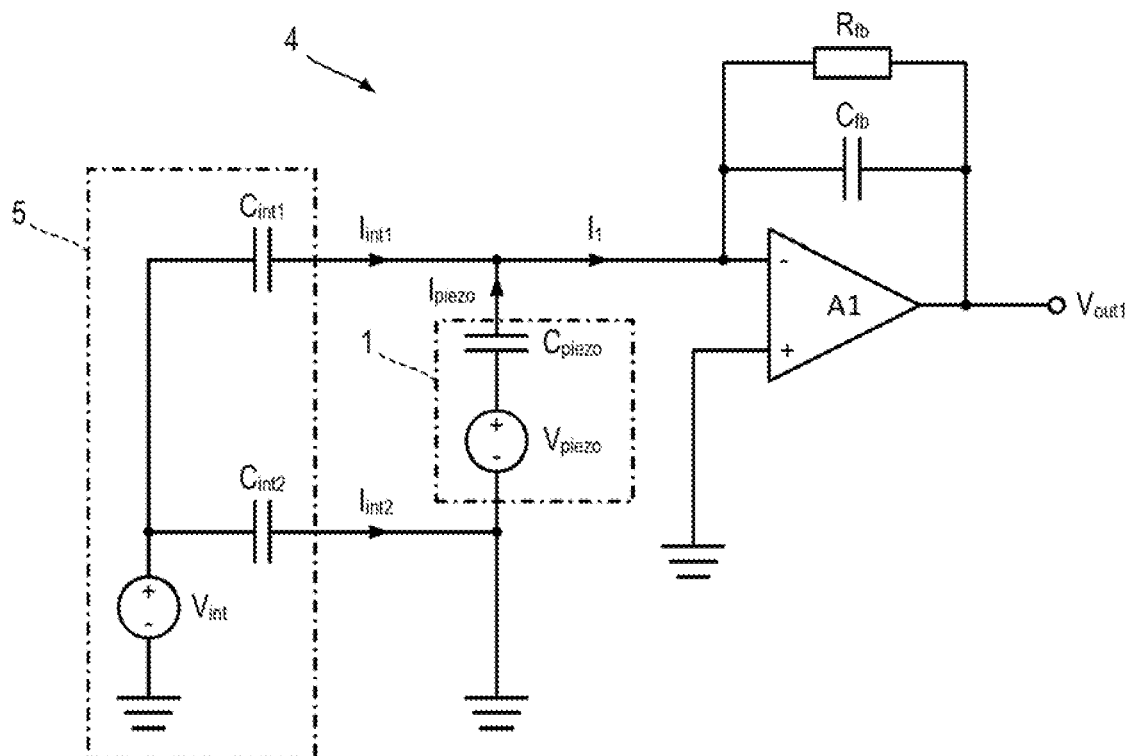
FIG. 4 is a circuit diagram of a third measurement circuit.

Referring also to FIG. 4, a third example of a measurement circuit 4 is shown.

The third measurement circuit 4 is the same as the second measurement circuit 3, except that it includes an equivalent circuit 5 representing capacitive coupling to an external source of electromagnetic interference, $V_{int}$.

A potential issue with single-ended amplifiers A1 is that external electric fields may induce a charge on the amplifier input that may be interpreted as a piezoelectric pressure signal. This problem may occur in the piezoelectric force sensors of touch screens for piezoelectric pressure sensing or touch screens for combined capacitive touch and piezoelectric pressure sensing. A users' digit or conductive stylus applying the force to be measured is typically separated from the electrodes forming a piezoelectric force sensor by one or several thin layers of glass and/or plastic. A users' digit or conductive stylus may be at a different potential to the electrodes forming a piezoelectric force sensor. Such potential differences may arise due to, for example, electrostatic charging or coupling to other electrical sources, for example, pick-up induced by a mains power supply.

In the third measurement circuit 4, an interfering electromagnetic source $V_{int}$ couples to both electrodes of the piezoelectric sensor 1 via a pair of capacitances $C_{int1}$ and $C_{int2}$. Consequently, the measured signal $I_1$ is a superposition of the desired piezoelectric pressure signal $I_{piezo}$ and an unwanted interference signal $I_{int1}$, i.e. $I_1 = I_{piezo} + I_{int1}$. The inclusion of the interference signal component $I_{int1}$ in the measured signal $I_1$ may cause errors in determining an applied force, for example false detection of an applied force and/or causing the smallest reliably measureable increment of applied force to be increased. Although signal post-processing methods may be applied in an attempt to reduce or remove the effects of unwanted interference signal $I_{int1}$, such post-processing should preferably be applied only when the measured signal $I_1$ is known, or highly likely, to be influence by the unwanted interference signal $I_{int1}$. Otherwise, there would be a risk of reducing or removing real signal $I_{piezo}$.

Differential measurements: The current flow induced in response to polarisation P of piezoelectric material between a pair of first and second electrodes forming a piezoelectric sensor 1 has the opposite sense in each of the first and second electrodes. By contrast, interference signals induced by external sources $V_{int}$ will have the same sign for the first and second electrodes forming a piezoelectric sensor 1. One approach to mitigating the influence of interference caused by coupling to external electrical fields is to perform differential measurements.

Figure 5:
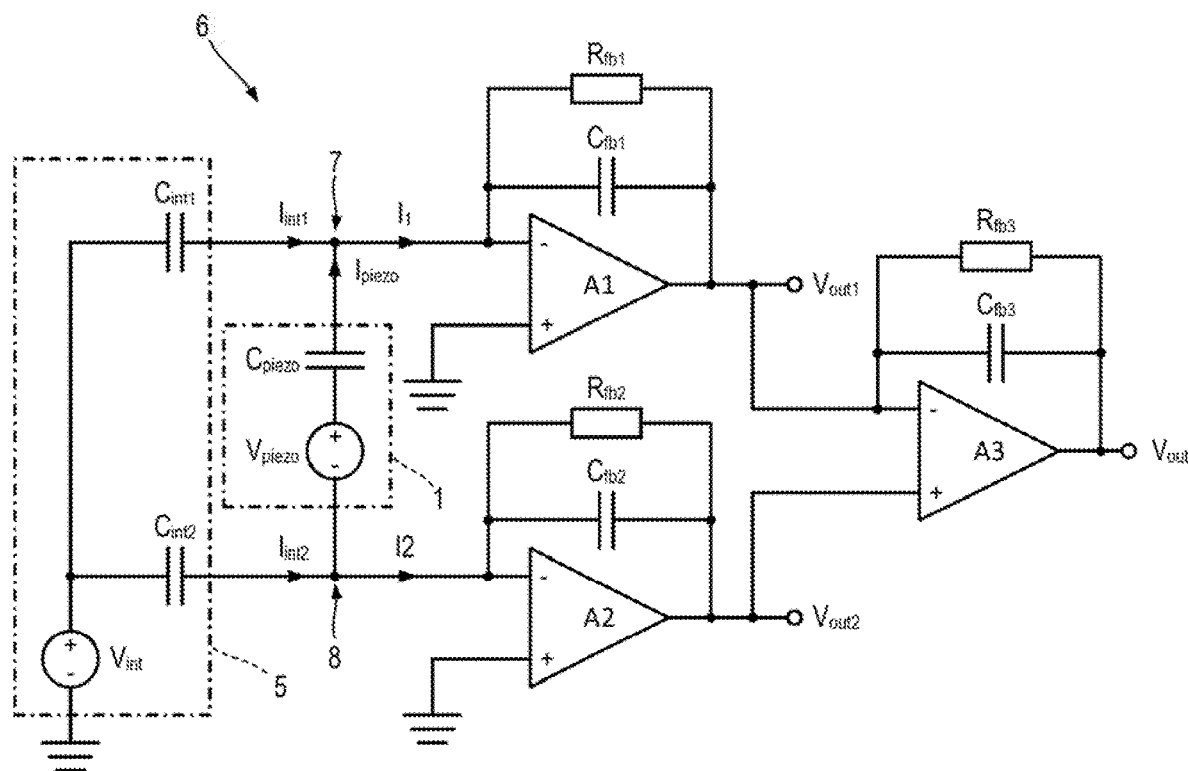
FIG. 5 is a circuit diagram of a fourth measurement circuit.

Referring also to FIG. 5, a fourth example of a measurement circuit 6 is shown.

In the fourth measurement circuit 6, a first single-ended amplifier A1 has one input connected to a first electrode 7 of the piezoelectric sensor 1 to receive a first measurement current $I_1$, and the other input of the first amplifier A1 is grounded. Similarly, a second single-ended amplifier A2 has one input connected to a second electrode 8 of the piezoelectric sensor 1 to receive a second measurement current $I_2$, and the other input of the second amplifier A2 is grounded. A third single-ended amplifier A3 has one input connected to the output $V_{out1}$ of the first amplifier A1 and the other input connected to the output $V_{out2}$ of the second amplifier A2. Each of the amplifiers A1, A2, A3 has a respective resistive-capacitive feedback network $R_{fb1}$-$C_{fb1}$, $R_{fb2}$-$C_{fb2}$, $R_{fb3}$-$C_{fb3}$.

The interfering source $V_{int}$ is capacitively coupled to the first electrode 7 by a first capacitance $C_{int1}$ and to the second electrode 8 by a second capacitance $C_{int2}$. As discussed hereinbefore, the current flow $I_{piezo}$ induced in response to polarisation P of piezoelectric material between the first and second electrodes 7, 8 has the opposite sense in each of terminals 7, 8, whereas interference signals $I_{int1}$, $I_{int2}$ induced by the interfering source $V_{int}$ will have the same sign. Accordingly, the first and second measurement currents may be approximated as:

$$I_1 = I_{int1} + I_{piezo}$$

$$I_2 = I_{int2} - I_{piezo} \tag{1}$$

The third amplifier A3 is used to obtain a difference, and when $I_{int1} \approx I_{int2}$, the output $V_{out}$ of the third amplifier A3 will be related to:

$$I_1 - I_2 \approx 2 I_{piezo} \tag{2}$$

In this way, by measuring the current flowing from both electrodes 7, 8 of the piezoelectric sensor 1 it is possible to determine a measure of the piezoelectric current $I_{piezo}$ in which the influence of the interfering source $V_{int}$ is reduced or removed.

Alternatively, if the outputs of the first and second amplifiers A1, A2 are instead summed, for example by inverting one of the outputs $V_{out1}$, $V_{out2}$, then the output $V_{out}$ of the third amplifier A3 will be related to:

$$I_1 + I_2 \approx I_{int1} + I_{int2} \tag{3}$$

In this way, the summed signal may be approximately independent of the piezoelectric current $I_{piezo}$. Although this may appear counter-intuitive, the inventors of the present specification have realised that the summed signal $I_1 + I_2$ may serve as an indicator of the presence or absence of an external interfering source $V_{int}$. Consequently, a summed signal $I_1 + I_2$ may be used to trigger the application of signal post-processing when such post-processing is needed in order to mitigate the effects of an external interfering source $V_{int}$. Avoiding unnecessary post-processing may reduce the possibility of inadvertently reducing or removing unusually strong or sharp real signals. This may have the effect of improving the reliability and sensitivity of a piezoelectric touch panel system or a combined piezoelectric and capacitive touch panel system. Whilst the utility of obtaining the summed signal $I_1 + I_2$ may not be immediately apparent when applied to a simple two-electrode piezoelectric sensor 1, as explained hereinafter this method may be more useful when applied to piezoelectric touch panels 10 (FIG. 7) including a greater number of sensing electrodes.

In the general case, if $C_{int1} \neq C_{int2}$ and $I_{int} \neq I_{int2}$, a weighted difference may be used. For example, if $I_{int1} = \alpha \cdot I_{int2}$, in which $\alpha$ is a scalar constant determined from calibration experiments, then the influence of an interfering source $V_{int}$ may be reduced or removed by obtaining:

$$I_1 - \alpha I_2 = (1+\alpha) I_{piezo} \quad (4)$$

By contrast, even in the general case the piezoelectric currents generated in first and second electrodes 7, 8 should substantially cancel each other (for example, up to a measurement error) when summed together. Consequently, when the measured signals $I_1$, $I_2$ are summed, the piezoelectric current $I_{piezo}$ should still be cancelled (excepting any measurement error), obtaining:

$$I_1 + I_2 \approx I_{int1} + I_{int2}$$

$$I_1 + I_2 \approx (1+\alpha) I_{int2} \quad (5)$$

In general, obtaining the difference or the sum of the measured signals $I_1$, $I_2$ may be performed by specifically configured circuits at the analogue signal level, or by post-processing following conversion to digital signals. For example, whilst the fourth measurement circuit 6 is configured to obtain the difference of the outputs $V_{out1}$, $V_{out2}$ of the first and second amplifiers A1, A2, in an alternative arrangement the sum may be obtained by replacing the third amplifier A3 with a summer (not shown) or by inverting the output $V_{out1}$, $V_{out2}$ of either one of the first and second amplifiers A1, A2.

It is not necessary to know the absolute values of the interference capacitors $C_{int1}$, $C_{int2}$. From Equation (4), it may be observed that all that is needed is the ratio $\alpha$ of noise introduced on the first electrode 7 to that introduced to the second electrode 8. The ratio $\alpha$ may be obtained from calibration experiments, for example, by deliberately introducing a test signal that mimics an interference signal $V_{int}$ to the system and recording the response of the first and second measurement currents $I_1$, $I_2$ in the absence of applying any force to the piezoelectric sensor 1, i.e. such that $I_1 = I_{int1}$ and $I_2 = I_{int2}$. This information may be used to determine the correction ratio as $\alpha = I_1/I_2$.

In practice, the correction may be performed by obtaining a difference of the first and second amplifier A1, A2 outputs $V_{out1}$, $V_{out2}$ in the fourth measurement circuit 6. This may be calibrated in the same way by obtaining a ratio of the outputs $V_{out1}$, $V_{out2}$ in response to a test signal and in the absence of any force applied to the piezoelectric sensor 1. If the ratio $\beta = V_{out1}/V_{out2}$ determined from calibration is not approximately unity, then a weighted difference $V_{out1} - \beta \cdot V_{out2}$ may be obtained by inserting appropriate impedances between the outputs $V_{out1}$, $V_{out2}$ of the first and second amplifiers A1, A2 and the respective inputs of the third amplifier A3. Alternatively, the third amplifier A3 may be omitted and a weighted difference $V_{out1} - \oplus \cdot V_{out2}$ may be obtained by processing in the digital signal domain.

Alternatively, when a summed signal, for example $I_1 + I_2$ or $V_{out1} + V_{out2}$, is obtained the constant $\alpha$ may not need to be determined. One or more threshold values $V_{thresh}$ for the summed signal $V_{out1} + V_{out2}$ in the absence of any interfering source $V_{int}$ should be calibrated in advance. Subsequently, if the summed signal $V_{out1} + V_{out2}$ exceeds the calibrated threshold values $V_{thresh}$, this will provide a strong indication that an interfering source $V_{int}$ is influencing the measured signals $I_1$, $I_2$.

Figure 6:
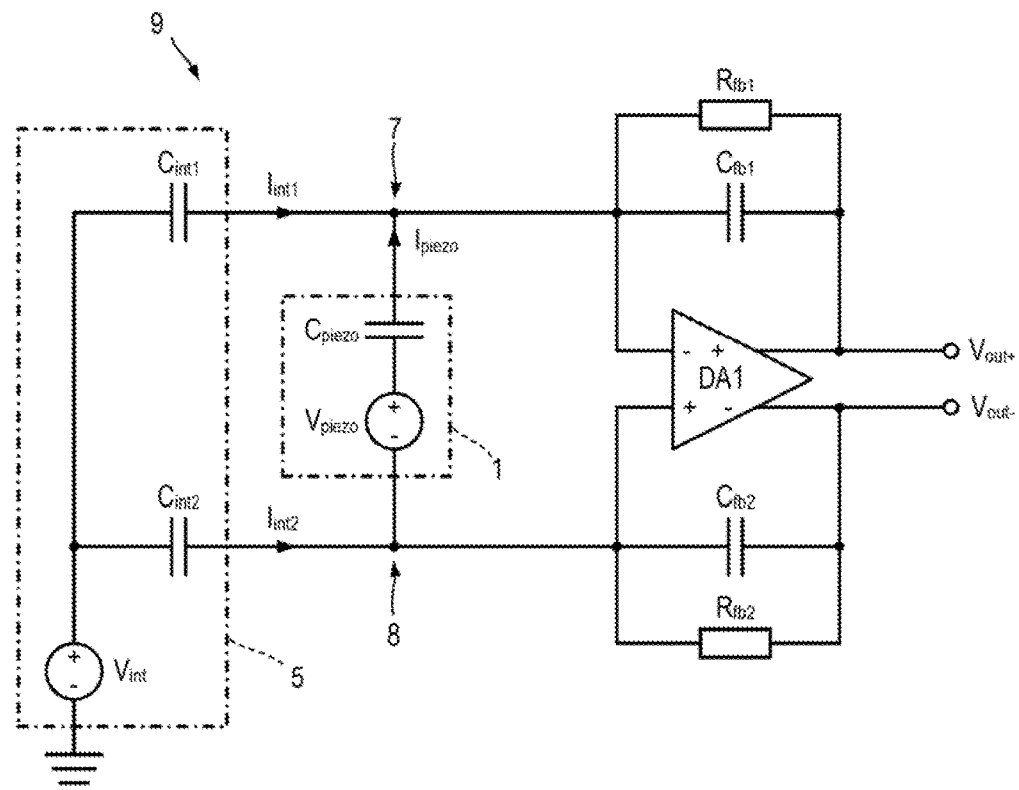
FIG. 6 is a circuit diagram of a fifth measurement circuit.

Referring also to FIG. 6, a fifth example of a measurement circuit 9 is shown.

In the fifth measurement circuit 9, a differential amplifier DA1 has one input connected to the first electrode 7 and the other input connected to the second electrode 8. The reduction or removal of influence of an interfering source $V_{int}$ may be implemented in the analogue domain by setting the values of a first feedback network $R_{fb1}$, $C_{fb1}$ and a second feedback network $R_{fb2}$, $C_{fb2}$ according to the ratio between the interfering capacitances $C_{int1}$, $C_{int2}$. For example, by selecting $C_{fb1}/C_{fb2} = C_{int1}/C_{int2}$. Such selection may be performed through calibration experiments similar to those described hereinbefore and by using, for example, trimmer capacitors to provide the feedback capacitances $C_{fb1}$, $C_{fb2}$.

Alternatively, signals from the first and second electrodes 7, 8 may be input to a summer (not shown) to obtain a summed signal.

Measurements in touch panels for piezoelectric pressure measurements: In the examples described hereinbefore, measurements have been described in relation to piezoelectric sensors 1 in which the first and second electrodes 7, 8 may be substantially co-extensive and of simple geometry. Such a configuration permits relatively simple differential measurements. However, in a practical touch panel for piezoelectric pressure measurements or combined capacitance and piezoelectric pressure measurements, a first electrode 7 may be one of many electrodes which share a common second electrode 8. Additionally, in some example a first electrode 7 may be an electrode which additionally functions as a receiving, Rx, and/or transmitting, Tx, electrode of a capacitance measurement system. In such touch panels, the second electrode 8 may be a common counter electrode having a relatively larger, or much larger, total area than each, of a number of first electrodes 7. Providing separate, matched counter electrodes for each Rx and/or Tx electrode would require an additional patterned conductive layer or layers, and the associated electrical connections. Consequently, simple differential measurements as illustrated in relation to the fourth or fifth measurement circuits 6, 9 may not be practical or desirable.

Instead of differential measurements, the present specification describes methods for obtaining and using summed measurements of signals from a touch panel for piezoelectric pressure measurements which includes at least one, unpatterned common electrode (corresponding to the second electrode 8, sometimes referred to as a counter-electrode). The methods of the present specification are equally applicable to touch panels for combined capacitance and piezoelectric pressure measurements. The summed signals may be used to detect the presence or absence of unwanted interference signals induced, for example, by an interfering source $V_{int}$, electrostatic charging of a user, and so forth. The methods of the present specification are also applicable (with minor modifications) to touch panels for piezoelectric pressure measurements or for combined capacitance and piezoelectric pressure measurements in which there are two or more second electrodes 8, each being common to two or more first electrodes 7.

Figure 7:
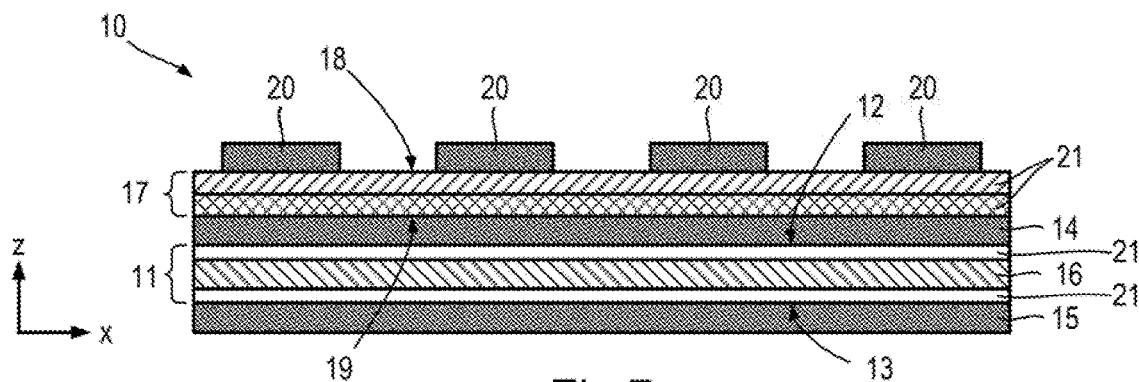
FIG. 7 is a cross-sectional view of a first touch panel for piezoelectric pressure measurements.

First apparatus: Referring to FIG. 7, a first example of a touch panel 10 for piezoelectric pressure measurements or combined capacitive and piezoelectric pressure measurements is shown.

The first touch panel 10 includes a first layer structure 11 having a first face 12 and a second, opposite, face 13. A number of first sensing electrodes 14 are disposed on the first face 12 of the first layer structure 11. Each of the first sensing electrodes 14 extends (or equivalently is elongated) in a first direction x, and the first sensing electrodes 14 are spaced apart in a second direction y. A common electrode 15 is disposed to substantially cover the second face 13 of the first layer structure 11.

The first layer structure 11 includes one or more layers, including at least a layer of piezoelectric material 16. Each layer included in the first layer structure 11 is generally planar and extends in first x and second y directions which are perpendicular to a thickness direction z. The one or more layers of the first layer structure 11 are arranged between the first and second faces 12, 13 such that the thickness direction z of each layer of the first layer structure 11 is substantially perpendicular to the first and second faces 12, 13.

The first touch panel 10 also includes a second layer structure 17 having a first face 18 and a second, opposite, face 19. A number of second sensing electrodes 20 are disposed on the first face 18 of the second layer structure 17. Each of the second sensing electrodes 20 extends (or equivalently is elongated) in the second direction y, and the second sensing electrodes 20 are spaced apart in a first direction x.

The second layer structure 17 includes one or more dielectric layers 21. Each dielectric layer 21 is generally planar and extends in first x and second y directions which are perpendicular to a thickness direction z. The one or more dielectric layers 21 of the second layer structure 17 are arranged between the first and second faces 18, 19 of the second layer structure 17 such that the thickness direction z of each dielectric layer 21 of the second layer structure 17 is perpendicular to the first and second faces 18, 19.

Preferably, the layer of piezoelectric material 16 includes or is formed of a piezoelectric polymer such as polyvinylidene fluoride (PVDF) or polylactic acid. However, the layer of piezoelectric material 16 may alternatively be a layer of a piezoelectric ceramic such as lead zirconate titanate (PZT). Preferably, the first and second sensing electrodes 14, 20, and the common electrode 15 are formed from silver nanowires. However, the first and second sensing electrodes 14, 20, and the common electrode 15 may alternatively be formed of transparent conductive oxides such as indium tin oxide (ITO) or indium zinc oxide (IZO). The first and second sensing electrodes 14, 20, and the common electrode 15 may be metal films such as aluminium, copper, silver or other metals suitable for deposition and patterning as a thin film. The first and second sensing electrodes 14, 20, and the common electrode 15 may be conductive polymers such as polyaniline, polythiphene, polypyrrole or poly(3,4-ethylenedioxythiophene) polystyrene sulfonate (PEDOT/PSS). The first and second sensing electrodes 14, 20, and the common electrode 15 may be formed from a metal mesh, metallic nanowires, graphene, and/or carbon nanotubes. The dielectric layer(s) 21 may include layers of a polymer dielectric material such as polyethylene terephthalate (PET) or layers of pressure sensitive adhesive (PSA) materials. However, the dielectric layer(s) 21 may include layers of a ceramic insulating material such as aluminium oxide.

The first layer structure 11 may include only the layer of piezoelectric material 16 such that the first and second opposite faces 12, 13 are faces of the piezoelectric material layer 16. Alternatively, the first layer structure 11 may include one or more dielectric layers 21 which are stacked between the layer of piezoelectric material 16 and the first face 12 of the first layer structure 11. The first layer structure 11 may include one or more dielectric layers 21 stacked between the second face 13 of the first layer structure 11 and the layer of piezoelectric material 16.

The second layer structure 17 may include only a single dielectric layer 21, such that the first and second faces 18, 19 of the second layer structure 17 are faces of a single dielectric layer 21.

Figure 19:
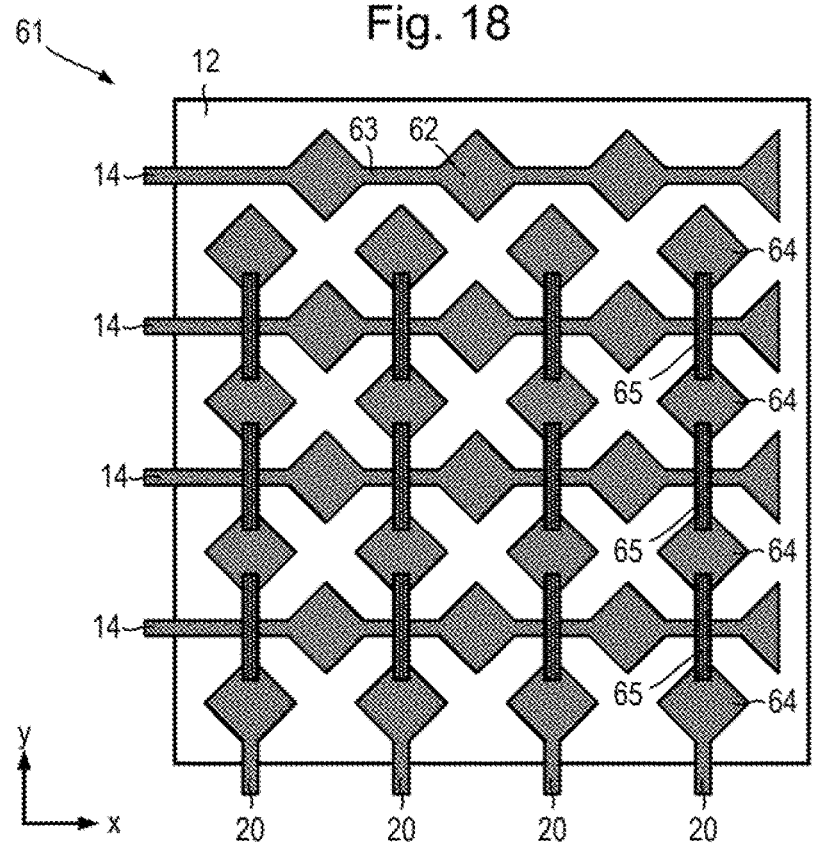
FIG. 19 is a plan view of a third touch panel for piezoelectric pressure measurements.

Alternatively, a second layer structure 17 need not be used (see FIG. 17), and the second sensing electrodes 20 may be disposed on the first face 12 along with the first sensing electrodes (FIG. 19).

In FIG. 7, the first touch panel 10 has been shown with reference to orthogonal axes labelled x, y, and z. However, the first, second and thickness directions need not form a right handed orthogonal set.

Figure 8:
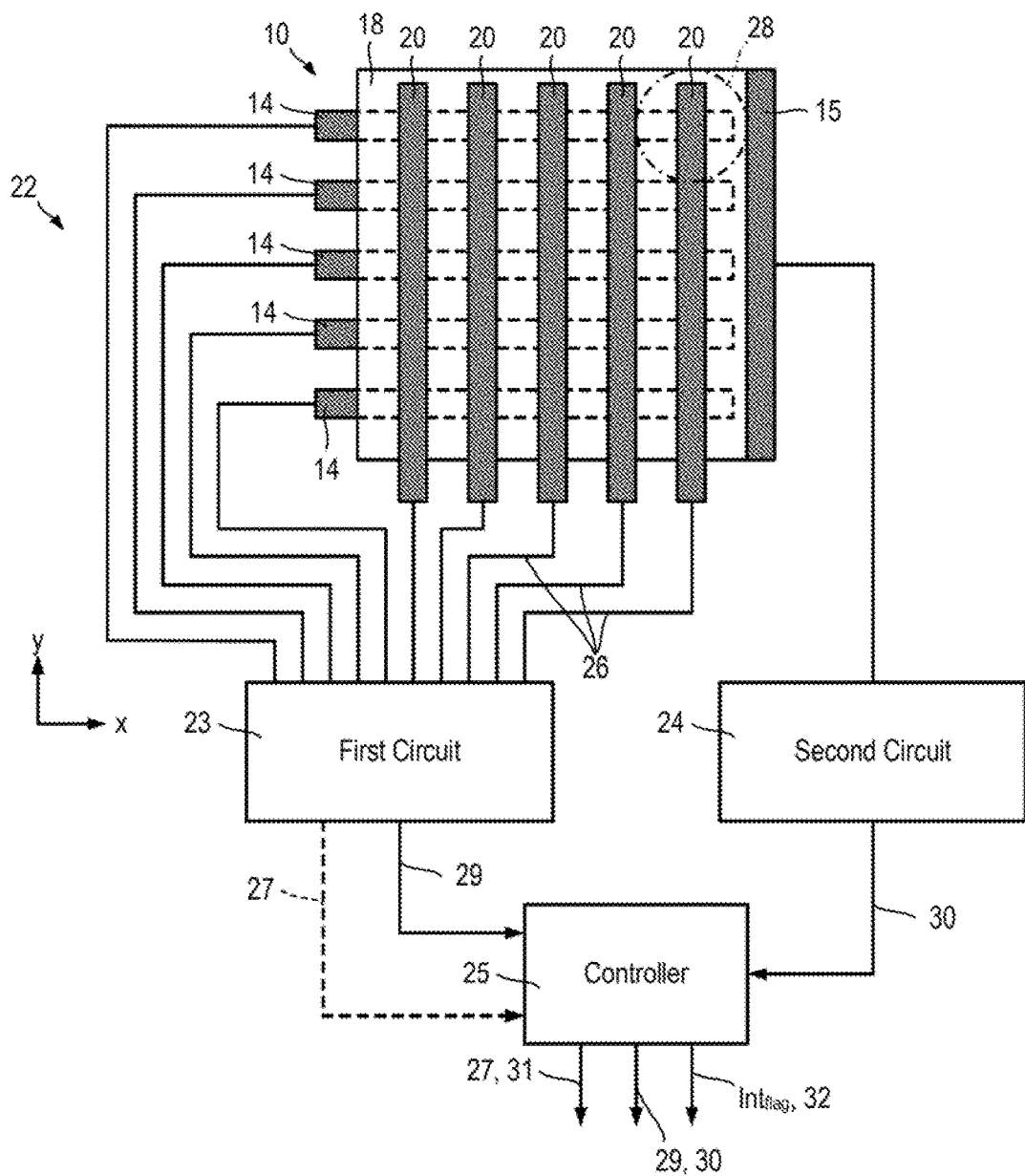
FIG. 8 illustrates a first apparatus for piezoelectric pressure measurements.

Referring also to FIG. 8, a first apparatus 22 for piezoelectric pressure measurements or combined capacitance and piezoelectric pressure measurements is shown.

The first apparatus 22 includes the first touch panel 10, a first circuit 23, a second circuit 24 and a controller 25. Each of the first and second sensing electrodes 14, 20 is connected to the first circuit 23 by a corresponding conductive trace 26. The common electrode 15 is connected to the second circuit 24.

The first circuit 23 receives from and/or transmits signals to the first and second sensing electrodes 14, 20. The first circuit 23 measures first piezoelectric pressure signals 29. The first circuit 23 is connectable to each of the first and second sensing electrodes 14, 20, in groups or individually. Each first piezoelectric pressure signal 29 corresponds to one or more of the first or second sensing electrodes 14, 20, and each first piezoelectric pressure signal 29 is indicative of a pressure acting on the touch panel 10 proximate to the respective first or second sensing electrodes 14, 20. For example, the first circuit may measure or generate a first piezoelectric pressure signal 29 corresponding to each first sensing electrode 14 and a first piezoelectric pressure signal 29 corresponding to each second sensing electrode 20. Alternatively, each first piezoelectric pressure signal 29 may correspond to a pair of adjacent first or second sensing electrodes 14, 20, and so forth. Each sensing electrode 14, 20 contributes to one first piezoelectric pressure signal 29.

Optionally, the first circuit 23 may also measure mutual capacitance signals 27 corresponding to each intersection 28 of the first and second sensing electrodes 14, 20. In other examples, the first circuit 23 may instead measure self-capacitance signals corresponding to each first and second sensing electrode 14, 20. The first circuit 23 may determine the capacitance signals 27 and the first piezoelectric pressure signals 29 concurrently. Alternatively, the first circuit 23 may alternate between determining the capacitance signals 27 and the first piezoelectric pressure signals 29.

For example, the first circuit 23 may be configured for combined capacitance and piezoelectric pressure measurements as described in WO 2016/102975 A2, the entire contents of which are incorporated herein by reference. In particular, the first circuit 23 may be configured as described in relation to examples shown FIGS. 21 to 26 of WO 2016/102975 A2. Alternatively, the first circuit 23 may be configured for combined capacitance and piezoelectric pressure measurements as described in WO 2017/109455 A1, the entire contents of which are incorporated herein by reference. In particular, the first circuit 23 may be configured as described in relation to examples shown in FIGS. 4 to 21 of WO 2017/109455 A1. In other examples, the first circuit 23 may be configured as described hereinafter with reference in particular to FIGS. 15 to 20.

However, the methods of the present specification are not limited to these examples, and are applicable to any first circuit 23 which is capable of providing the hereinbefore described functions.

The second circuit 24 measures a second piezoelectric pressure signal 30 which corresponds to the common electrode 15. The second piezoelectric signal 30 should be indicative of a total pressure applied to the touch panel 10. When more than one common electrode 15 is used, a second piezoelectric signal 30 may be generated corresponding to each common electrode 15, for subsequent summation by the controller 25. Alternatively, when more than one common electrode 15 is used, the second circuit 24 may generate a single second piezoelectric signal 30 based on charges induced on all the common electrodes 15. Under ideal conditions and in the absence of external interference, a sum over the second piezoelectric pressure signals 30 and the first piezoelectric signals 29 should be approximately zero (up to a measurement error) because the sensing electrodes 14, 20 and the common electrode(s) 15 are arranged on opposite sides of any polarisation P induced in the layer of piezoelectric material 16.

The piezoelectric pressure signals 29, 30, and optionally the capacitance signals 27, are produced in response to a user interaction with the first touch panel 10, or with a layer of material overlying the first touch panel 10. In the following description, reference to a "user interaction" shall be taken to include a user touching or pressing a touch panel 10 or an overlying layer of material. The term "user interaction" shall be taken to include interactions involving a user's digit or a stylus (whether conductive or not). The term "user interaction" shall also be taken to include a user's digit or conductive stylus being proximate to a touch sensor or touch panel without direct physical contact (i.e. zero or negligible applied pressure).

The controller 25 receives the first and second piezoelectric pressure signals 29, 30, and sums them to generate an external interference signal 32. The external interference signal 32 may be a simple sum over the unweighted first and second piezoelectric pressure signals 29, 30, or the external interference signal 32 may be a weighted sum over the first and second piezoelectric pressure signals 29, 30. The controller 25 is also configured to compare the external interference signal 32 against a pre-calibrated threshold (for example $V_{thresh}$). The controller 25 is also configured, in response to the external interference signal 32 being greater than or equal to the pre-calibrated threshold, to output an interference flag $Int_{flag}$ indicating that the first and second pressure signals 29, 30 are influenced by coupling to one or more external electrical fields. The interference flag $Int_{flag}$ may be output to a processor (not shown) which controls a device (not shown) incorporating the first apparatus 22. Optionally, the external interference signal 32 may also be output to the processor (not shown) to provide an indication of the magnitude of external interference. In further examples, the external interference signal 32 may be output to the processor (not shown), and the processor (not shown) may perform the comparison and generate the interference flag $Int_{flag}$. The controller 25 additionally relays the raw first and/or second piezoelectric pressure signals 29, 30 to the processor (not shown) which operates the device (not shown) incorporating the first apparatus 22. In some examples, the processor (not shown) rather than the controller 25 may simply output the first and second pressure signals 29, 30 to the processor (not shown), and the processor (not shown) may determine the external interference signal 32.

In some examples, the controller 25 may determine touch location data 31 based on the first and second pressure signals 29, 30. The touch location data 31 indicates the location, for example x, y coordinates, of one or more user interactions. The touch location data 31 is output to the processor (not shown) which operates the device (not shown) incorporating the first apparatus 22.

When measured, the controller 25 receives the capacitance signals 27 and either relays them to a processor (not shown) which operates a device (not shown) incorporating the first apparatus 22, or performs further processing of the capacitance values 27. For example, the controller 25 may process the capacitance values 27 to generate the touch location data 31 for output to the processor (not shown) which operates the device (not shown) incorporating the first apparatus 22. Capacitance signals 27 may permit more accurate determination of the touch location data 31 than the first and second pressure signals 29, 30 alone.

Figure 9:
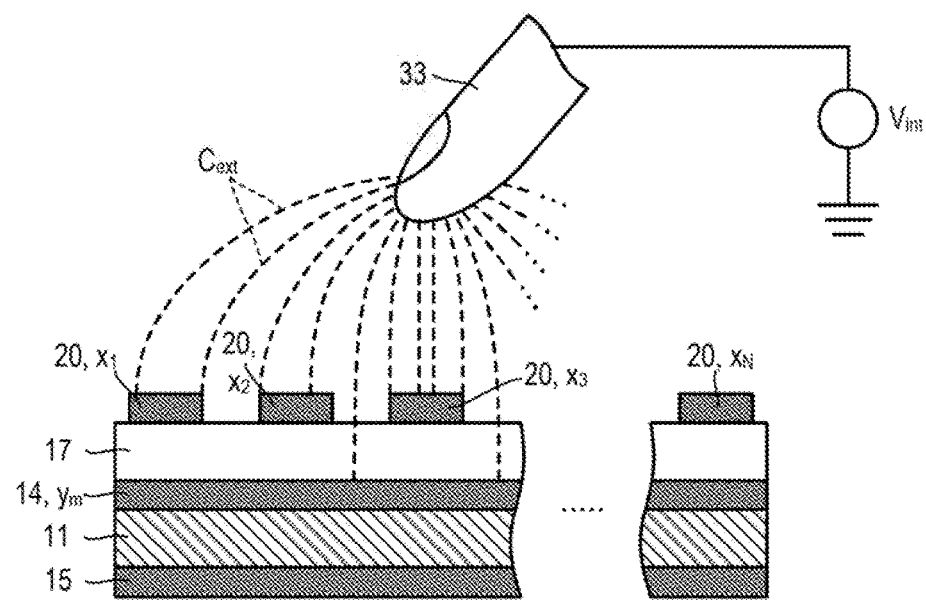
FIGS. 9 and 10 illustrate methods of obtaining piezoelectric pressure measurements.
Figure 10:
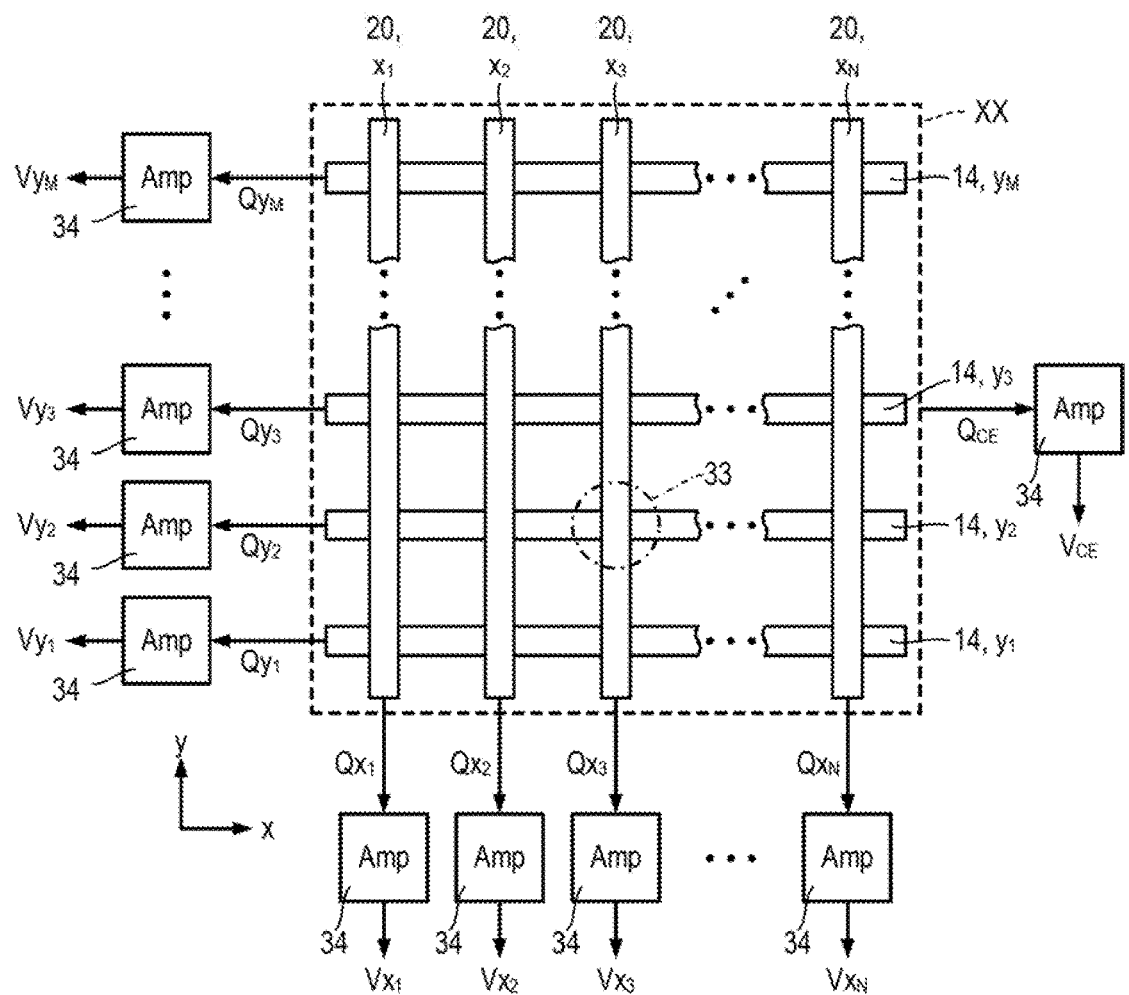

Method of detecting the presence and/or extent of coupling to external electrical fields: Referring also to FIGS. 9 and 10, a method of detecting the presence and/or extent of coupling to external electrical fields during piezoelectric pressure measurements will be described.

An object 33, for example a user's digit, which is proximate to or touching the touch panel 10 may become charged to a potential $V_{int}$ by electrostatic charging, or from acting as an antenna for a source $V_{int}$ of electromagnetic interference. There is a capacitive coupling $C_{ext}$ between the object 33 and the overall assemblage of all of the sensing electrodes 14, 20 and the common electrode 15. A total electrostatic charge $Q_{ES}$ is induced in the overall assemblage of all of the sensing electrodes 14, 20 and the common electrode 20 as approximately $Q_{WS} = C_{ext} \cdot V_{int}$. It should be noted that it may not be possible to calibrate $C_{ext}$ in practice, because the precise geometry will be continually changing as a user moves their digit and/or stylus in relation to the touch panel 10, and also will vary between different users and different digits of the same user. Additionally, $V_{int}$ may not be measureable in general. However, determination or estimation of $C_{ext}$ and/or $V_{int}$ is not necessary for the method of detecting the presence and/or extent of coupling to external electrical fields.

The method is based on the premise that an unknown, total electrostatic charge $Q_{ES}$ induced on the electrodes 14, 15, 20 will be made up of a sum of individual electrostatic charges induced on each of the electrodes 14, 15, 20.

Hereinafter, the $m^{th}$ of M first sensing electrodes 14 may alternatively be denoted as $y_m$ and the $n^{th}$ of N second sensing electrodes 20 may alternatively be denoted as $x_n$. If the electrostatic charge induced on the $n^{th}$ of N second sensing electrodes 20, $x_n$ by the object 33 is denoted $Sx_n$ and so forth, the electrostatic charge induced on the $m^{th}$ of M first sensing electrodes 14, $y_m$ by the object 33 is denoted $Sy_m$ and so forth, and the electrostatic charge induced on the counter electrode 15 by the object 33 is denoted $S_{CE}$, then the total electrostatic charge $Q_{ES}$ may be approximated as:

$$Q_{ES} = \sum_{n=1}^{N} Sx_n + \sum_{m=1}^{M} Sy_m + S_{CE} \tag{6}$$

When polarisation P of the piezoelectric material layer 16 is induced between the common electrode 15 and the sensing electrodes $x_n$, $y_m$, the charges induced on the sensing electrodes $x_n$, $y_m$ have opposite polarity to the charges induced on the common electrode 15. In other words, external coupling to the object 33 induces charge flow between system ground or common mode voltage and the overall assemblage of all of the electrodes $x_n$, $y_m$, 15, whereas by contrast a polarisation P of the piezoelectric material layer 16 induces charge to flow between the counter electrode 15 and the sensing electrodes $x_n$, $y_m$. One consequence, as explained hereinbefore, is that charges induced by the polarisation P of the piezoelectric material layer 16 are expected to sum to zero, at least to within a measurement error.

If the piezoelectric charge induced on the $n^{th}$ of N second sensing electrodes $x_n$ by a polarisation P of the piezoelectric material layer 16 is denoted $Fx_n$ and so forth, the piezoelectric charge induced on the $m^{th}$ of M first sensing electrodes $y_n$ by a polarisation P of the piezoelectric material layer 16 is denoted $Fy_m$ and so forth, and the piezoelectric charge induced on the counter electrode 15 by a polarisation P of the piezoelectric material layer 16 is denoted $F_{CE}$, then a total induced piezoelectric charge $Q_{PT}$ may be approximated as:

$$Q_{PT}=0=\Sigma_{n=1}^{N}Fx_n+\Sigma_{m=1}^{M}Fy_m+F_{CE} \quad (7)$$

It may be noted that the piezoelectric charge $F_{CE}$ induced on the counter electrode 15 may provide a good measure of the total force applied to the touch panel 10.

Referring in particular to FIG. 10, the charge induced on the $n^{th}$ of N second sensing electrodes $x_n$, 20 may be written as:

$$Qx_n=Sx_n+Fx_n \quad (8)$$

Similarly, the charge induced on the $m^{th}$ of M first sensing electrodes $y_m$, 14 may be written as:

$$Qy_m=Sy_m+Fy_m \quad (9)$$

and the charge induced on the counter electrode 15 may be written as:

$$Q_{CE}=S_{CE}+F_{CE} \quad (10)$$

In the method of detecting the presence and/or extent of coupling to external electrical fields, the charges $Qx_n$, $Qy_m$ measured on all of the sensing electrodes $x_n$, $y_m$ are summed with the charge $S_{CE}$ measured on the common electrode 15 to yield:

$$Q_{ext} = \sum_{n=1}^{N} Qx_n + \sum_{m=1}^{M} Qy_m + Q_{CE} \quad (11)$$

$$Q_{ext} = \sum_{n=1}^{N}(Sx_n+Fx_n) + \sum_{m=1}^{M}(Sy_m+Fy_m) + (S_{CE}+F_{CE})$$

$$Q_{ext} = \left(\sum_{n=1}^{N}Sx_n + \sum_{m=1}^{M}Sy_m + S_{CE}\right) + \left(\sum_{n=1}^{N}Fx_n + \sum_{m=1}^{M}Fy_m + F_{CE}\right)$$

In which $Q_{ext}$ is the sum of all the charges measured by the common electrode 15 and all of the sensing electrodes $x_n$, $y_m$. The external interference signal 32 may correspond to or be related to the sum $Q_{ext}$.

Referring to Equations (6) and (7), under ideal conditions the first bracketed term of Equation (11) is equal to the total electrostatic charge QES and the second bracketed term of Equation (11) is equal to zero. Under practical, non-ideal conditions, the external interference signal 32, Qext may be still be approximated to the total electrostatic charge QES:

$$\Sigma_{n=1}^{N}Qx_n+\Sigma_{m=1}^{M}Qy_m+Q_{CE}=Q_{ext}\approx Q_{ES} \quad (12)$$

In practice, the charges $Qx_n$, $Qy_m$, $Q_{CE}$ may be detected using charge amplifiers 34, such that a voltage output corresponding to the $n^{th}$ of N second sensing electrodes $x_n$, 20 is $Vx_n$, and is related to $Qx_n$, and so forth. Commonly, a charge amplifier 34 will integrate the input current. For example, if the current on the $n^{th}$ of N second sensing electrodes $x_n$ is $Ix_n$, then the voltage $Vx_n$ on the $n^{th}$ of N second sensing electrodes $x_n$ at a time t may, under ideal conditions, be expressed as:

$$Vx_n=Gx_nQx_n=Gx_n\int_0^t Ix_n(\tau)d\tau \quad (13)$$

In which $Gx_n$ is the gain of the $n^{th}$ of N charge amplifiers 34 connected to the N second sensing electrodes $x_n$ and $\tau$ is an integration variable. Similarly, the voltage on the $m^{th}$ of M first sensing electrodes $y_m$ may be expressed as:

$$Vy_m = Gy_mQy_m = Gy_m\int_0^t Iy_m(\tau)d\tau \quad (14)$$

In which $Gy_m$ is the gain of the $m^{th}$ of M charge amplifiers 34 connected to the M first sensing electrodes $y_n$, $Iy_m$ is the current on the $m^{th}$ of M first sensing electrodes $y_m$ and $\tau$ is an integration variable. Similarly, the voltage on the common electrode 15 may be expressed as:

$$V_{CE}=G_{CE}Q_{CE}=G_{CE}\int_0^t I_{CE}(\tau)d\tau \quad (15)$$

In which $G_{CE}$ is the gain of the charge amplifier 34 connected to the common electrode 15, $I_{CE}$ is the current on the common electrode 15 and $\tau$ is an integration variable. The external interference signal 32, denoted in this instance as $V_{ext}$, may be then approximated as the sum of all the charge amplifier 34 signals:

$$V_{ext} = \sum_{n=1}^{N} Vx_n + \sum_{m=1}^{M} Vy_m + V_{CE} \quad (16)$$

$$V_{ext} = \sum_{n=1}^{N} Gx_nQx_n + \sum_{m=1}^{M} Gy_mQy_m + G_{CE}Q_{CE}$$

If the gains are all substantially equal such that $Gx_n \approx Gy_m \approx G_{CE} \approx G$ then, the external interference signal 32 in terms of voltage $V_{ext}$, may be expressed as a simple multiple of the external interference signal 32 in terms of charge $Q_{ext}$, i.e. $V_{ext} \approx G.Q_{ext}$. However, in practice, the charge amplifier 34 gains $Gx_n$, $Gy_m$, $G_{CE}$ will not be identical. Furthermore, each charge amplifier 34 will in practice experience DC offsets and drift, in addition to time-dependent decay of low frequency and DC components in the voltage output (sometimes referred to as "roll-off").

Therefore, in practical terms, the external interference signal 32 may be viewed as corresponding to a measurement of the charge $Q_{ES}$ induced by an interfering source $V_{int}$, plus a noise term:

$$V_{ext}=\Sigma_{n=1}^{N}Vx_n+\Sigma_{m=1}^{M}Vy_m+V_{CE}=G_TQ_{ES}+\varepsilon \quad (17)$$

In which $G_T$ is a constant relating to the overall gain of the charge amplifiers 34 and $\varepsilon$ is a term representing the instantaneous error or noise resulting from the various sources described hereinbefore. The noise term $\varepsilon$ is thought to be primarily composed of residual components of the pressure signals which have not been cancelled out due to slight imbalances in the individual charge amplifier 34 gains $Gx_n$, $Gy_m$, $G_{CE}$. Although a value of the constant $G_T$ might be calibrated, this is unnecessary. All that is needed is to determine a suitable threshold value, $V_{thresh}$, above which it may be reliably determined that the external interference signal 32, $V_{ext}$, is detecting the influence of an interfering source $V_{int}$.

For example, the touch panel 10 may be placed in a shielded container and a range of input forces applied using a non-conductive stylus or comparable object 33. Under such circumstances, the total externally induced charge $Q_{ES}$ should be approximately zero, such that Equation (17) becomes:

$$V_{ext} \approx \varepsilon \quad (18)$$

After recording a suitable length of signal, spanning a suitable range of applied forces, for example between 0.5 N and 10 N, a suitable threshold $V_{thresh}$ may be determined based on the measured values of $\varepsilon$. The threshold $V_{thresh}$ may be set as a multiple of the maximum absolute value of $\varepsilon$ recorded. For example, $V_{thresh}=1.5\times\max(|\varepsilon|)$ or $V_{thresh}=2\times\max(|\varepsilon|)$ and so forth.

Alternatively, a standard error $\sigma_\varepsilon$ may be calculated based on the measured values of $\varepsilon$, and the threshold voltage $V_{thresh}$ may be set as a multiple of the standard error $\sigma_\varepsilon$. For example, $V_{thresh}=3\times\sigma_\varepsilon$ or $V_{thresh}5\times\sigma_\varepsilon$.

In use the controller 25 may obtain the external interference signal 32, $V_{ext}$ as the sum across the charge amplifier outputs $V_{CE}$, $Vx_n$, $Vy_m$, and compare it against the pre-calibrated threshold value $V_{thresh}$. If the amplitude of the external interference signal 32 is less than the threshold $V_{thresh}$, i.e. $|V_{ext}|>V_{thresh}$, then the piezoelectric pressure signals 29, 30 are unlikely to be significantly influenced by an external interference source $V_{int}$. In this case, the interference flag $Int_{flag}$ is left unset, set to a value of 'false' or zero, and so forth. However, if the amplitude of the external interference signal 32 is greater than or equal to the threshold $V_{thresh}$, i.e. $|V_{ext}| \leq V_{thresh}$, then the piezoelectric pressure signals 29, 30 are probably being influenced by an external interference source $V_{int}$. In this case, the interference flag $Int_{flag}$ is set to a suitable value such as, for example, 'true', unity, and so forth.

The functionality to determine the presence and/or extent of external electrical interference in the first and second piezoelectric pressure signals 29, 30 may allow for application of suitable post-processing methods for reducing or removing the influence of an external interference source $V_{int}$.

Rather than a simple unweighted sum over the outputs $Vx_n$, $Vy_m$, $V_{CE}$ of all of the charge amplifiers 34, in some examples it may be advantageous to calculate the external interference signal 32 as a weighted sum over the outputs $Vx_n$, $Vy_m$, $V_{CE}$. For example, a weighted external interference signal 32, $V'_{ext}$ may be determined according to:

$$V'_{ext} = \sum_{n=1}^{N} Ax_n Vx_n + \sum_{m=1}^{M} Ay_m Vy_m + A_{CE} V_{CE} = G_T Q_{ES} + \varepsilon' \quad (19)$$

In which $Ax_n$ are constants corresponding to $G_T/Gx_n$, $Ay_m$ are constants corresponding to $G_T/Gy_m$, $A_{CE}$ is a constant corresponding to $G_T/G_{CE}$, and $\varepsilon'$ is a reduced noise signal. Referring also to Equation (16), with appropriate calibration of the weighting factors $Ax_n$, $Ay_m$, $A_{CE}$, the weighted external interference signal 32, $V'_{ext}$ may experience reduced influence from any variability of the gains $Gx_n$, $Gy_m$, $G_{CE}$ of the charge amplifiers 34. It is evident that Equation (17) corresponds to a special case of Equation (19) when all of the weighting factors $Ax_n$, $Ay_m$, $A_{CE}$ are equal, i.e. $Ax_n=Ay_m=A_{CE}$.

Example of post-processing to reduce or remove external electrical noise: The subject of the present specification is the method of determining the presence and/or extent of coupling to external electrical fields, for example interference from an external interference source $V_{int}$. Once the presence of coupling to external electrical fields has been detected, the type of post-processing used to reduce or remove the effects of, for example influence of an external interference source $V_{int}$, is not particularly limited. Any suitable post-processing may be used. However, in order to help explain the usefulness of described method for determining the presence and/or extent of coupling to external electrical fields, it may be helpful to consider a specific, non-limiting example of a suitable post-processing method.

In a touch panel 10 for piezoelectric or combined capacitive and piezoelectric sensing, the effect of an applied force is typically detected by all of the sensing electrodes 14, 20, at least to some extent. This is thought to result from the touch panel 10 including a cover lens (not shown), which is often stiff glass, bending collectively, such that nearly every part of the layer of piezoelectric material 16 experiences some in-plane stretching. It should be noted that, depending on the mechanical boundary conditions on the touch panel 10, the maximum strain and maximum piezoelectric pressure signal 29 need not occur directly underneath the location of a user interaction.

Figure 11:
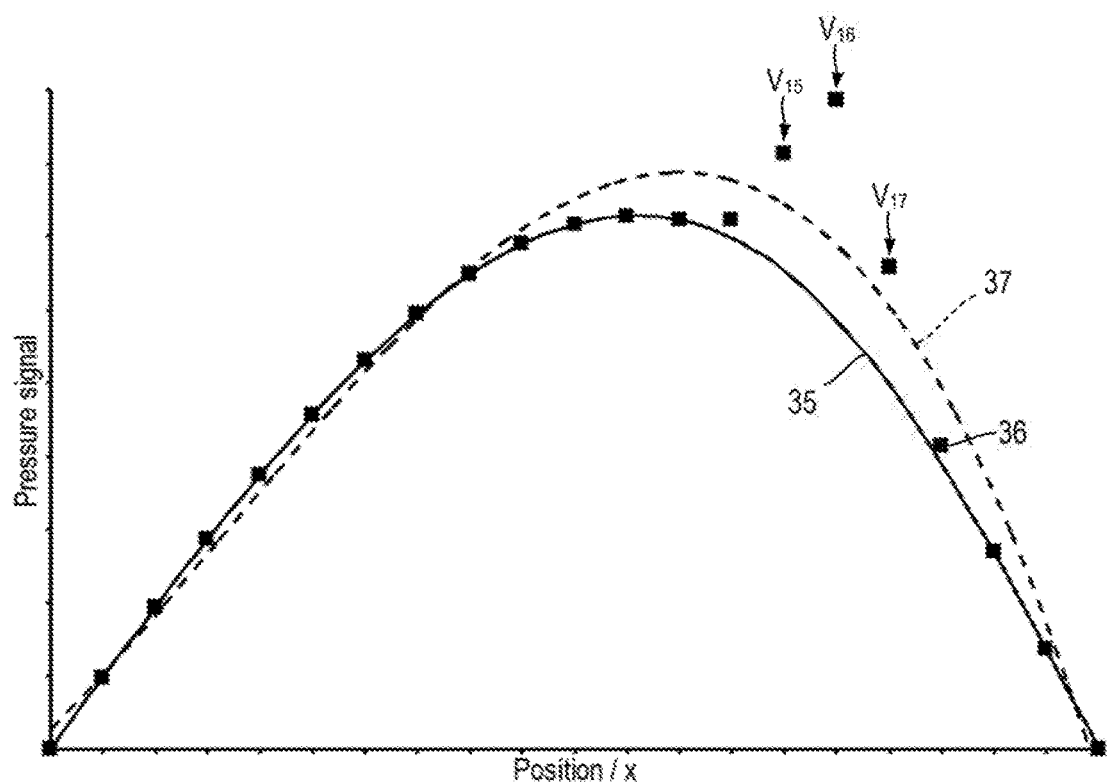
FIG. 11 illustrates a potential disparity between practical and idealised pressure signals in the presence of interference from an external source.

For example, referring also to FIG. 11, a visual illustration of idealised underlying pressure signal values 35 resulting from a force applied directly over the $16^{th}$ of N=21 second sensing electrodes 20, $x_1, \ldots, x_{21}$ is shown.

Purely for illustrative purposes, the underlying pressure signal values 35 are represented as being proportional to the deflection of a touch panel 10 modelled as an Euler-beam which is simply supported at either end ($x_1$, $x_{21}$). The underlying pressure signal values 35 represent values which might be measured in the absence of any interference from external electrical fields. In reality, the deflection of a touch panel 10 will correspond to a substantially more complex plate-deflection problem. However, the illustration of FIG. 11 serves to help visualise that the location of a user interaction need not correspond to the largest value of the first pressure signals 29. In general, the pressure signals 29 from a group, or all, of the first and second sensing electrodes 14, 20 may be used to invert the relevant plate-deflection problem so as to infer the forces applied by one or more user interactions.

By contrast, the effect of a user interaction on mutual capacitances between sensing electrodes 14, 20 is often localised to nearest and next-nearest electrodes 14, 20 with respect to the object 33 contacting the touch panel 10. Similarly, electrical interference coupled to the sensing electrodes 10 by the object 33 is typically largest for those sensing electrodes 14, 20 which are closest to the object 33.

Referring again to FIG. 11, measured pressure signal values 36 may deviate from the underlying pressure signal values 35 close to the point of application of the force, as a consequence of an object 33 coupling to the first and second sensing electrodes 14, 20. For example, the measured value $V_{16}$, correspond ng in this example to the nearest second sensing electrode 20, $x_{16}$ to a user interaction, may be strongly affected by external interference coupled in by the object 33. The values $V_{15}$, $V_{17}$ corresponding to the next-nearest second sensing electrodes 20, $x_{15}$, $x_{17}$ may also be noticeably affected by any external interference coupled in by the object 33. Such localised deviations caused by coupling to external electric fields may cause errors. For example, a fitting process based on the measured pressure signal values 36 may deviate from the underlying values 35, leading to an inaccurate re-construction of the forces applied by one or more user interactions. In FIG. 11, an example of a fitting using a polynomial best-fit line 37 (third order, dashed line) to the measured pressure signal values 36 may be observed to be significantly skewed away from the underlying pressure signal values 35. This deviation occurs primarily as a consequence of the values $V_{15}$, $V_{16}$, $V_{17}$ which are most affected by coupling to external electrical fields, for example an interfering source $V_{int}$ coupled to the object 33.

However, if the methods of the present specification are employed to determine when the measured pressure signal values 36 are coupled to external interference, then post-processing methods may be employed to reduce or remove the influence of the external interference.

Figure 12:
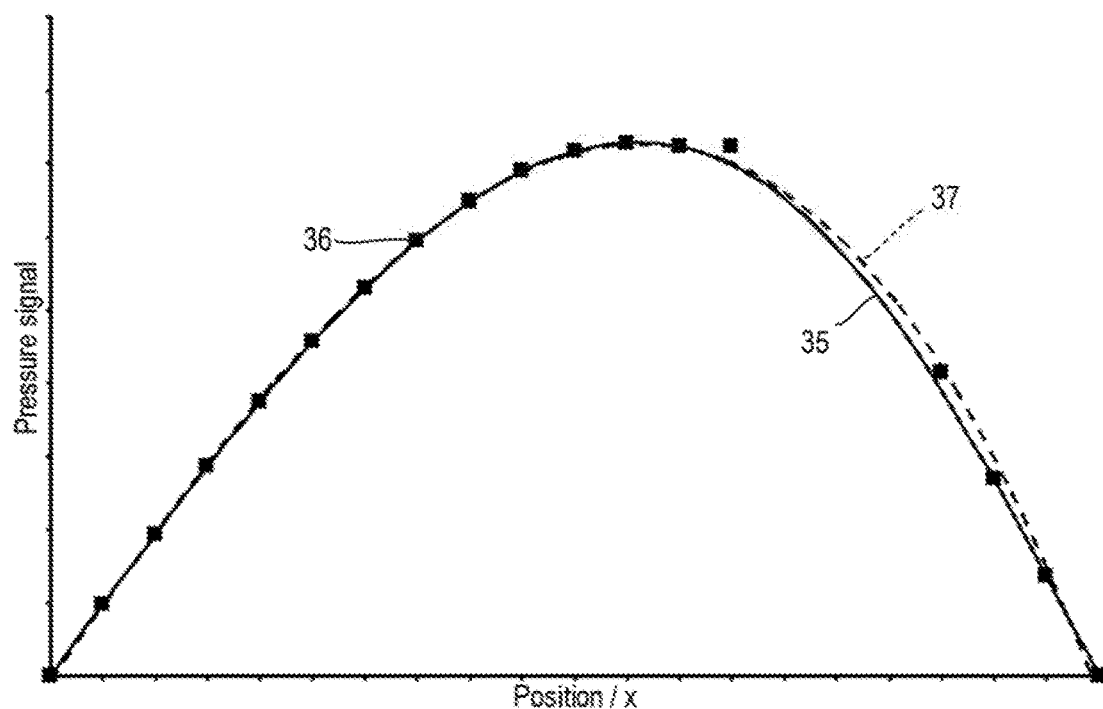
FIG. 12 illustrates an example of post-processing a measured pressure signal to reduce or remove interference from an external source.

For example, referring also to FIG. 12, in one simple, non-limiting example, the nearest $V_{16}$ and next-nearest $V_{15}$, $V_{17}$ measured values may be simply excluded in response to a detection of coupling to external electrical fields, i.e. when the interference flag $Int_{flag}$ is set to a value of 'true', unity and so forth. For example, when $V_{ext} \geq V_{thresh}$.

It may be observed that when the nearest $V_{16}$ and next-nearest $V_{15}$, $V_{17}$ measured values are excluded, a polynomial best-fit line 37 (third order, dashed line) displays closer agreement with the underlying pressure signal values 35. The same effect would be expected for any functional form of fitting or interpolation.

In this way, when there is no detection of coupling to external electrical fields (i.e. when the interference flag $Int_{flag}$ is unset or has a value of 'false', zero and so forth), all of the measured pressure signal values 36 may be used to determine the most accurate fitting of the touch panel 10 deflection, in order to determine the applied pressures/forces as accurately as possible. However, when the methods of the present specification detect coupling to an external interference source $V_{int}$, for example when $V_{ext} \geq V_{thresh}$ (i.e. when the interference flag $Int_{flag}$ is set to a value of 'true', unity and so forth), the most affected values may be excluded so as to reduce or remove the influence of the external interference.

The preceding examples shown and described with reference to FIGS. 11 and 12 are provided purely to illustrate the technical importance of being able to simply and reliably determine the presence and/or extent of external interference using the methods of the present specification.

In further examples, a fitting to non-excluded measured pressure signal values 36 may be used to interpolate or extrapolate replacement values for one or more excluded measured pressure signal values 36.

Figure 13:
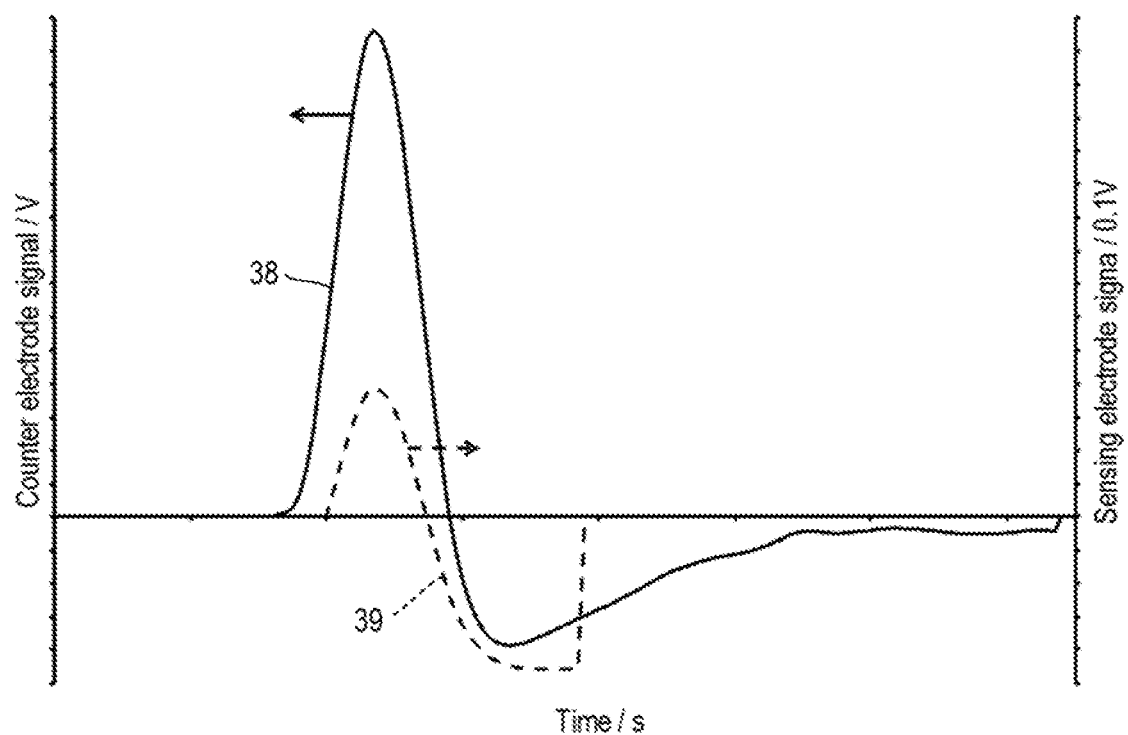
FIG. 13 shows measured signals corresponding to externally induced charges on a sensing electrode and a common electrode.

Experimental data: Referring also to FIG. 13, experimental data illustrating externally induced charges on a sensing electrode $x_n$, $y_m$ and the common electrode 15 are shown.

A first voltage signal 38 (solid line) corresponds to a charge amplifier 34 output measured for the common electrode 15. A second voltage signal 39 (dashed line) corresponds to a charge amplifier output measured for a sensing electrode $x_n$, $y_m$. The signals 38, 39 shown in FIG. 13 were obtained using an object 33 in the form of a digit charged to an electrostatic potential and held nearly touching a touch panel 10. No pressure was applied to the touch panel 10.

It may be observed that in FIG. 13, the first and second voltage signals 38, 39 have corresponding signs (in other words the signals have substantially the same polarities at a given time).

Figure 14:
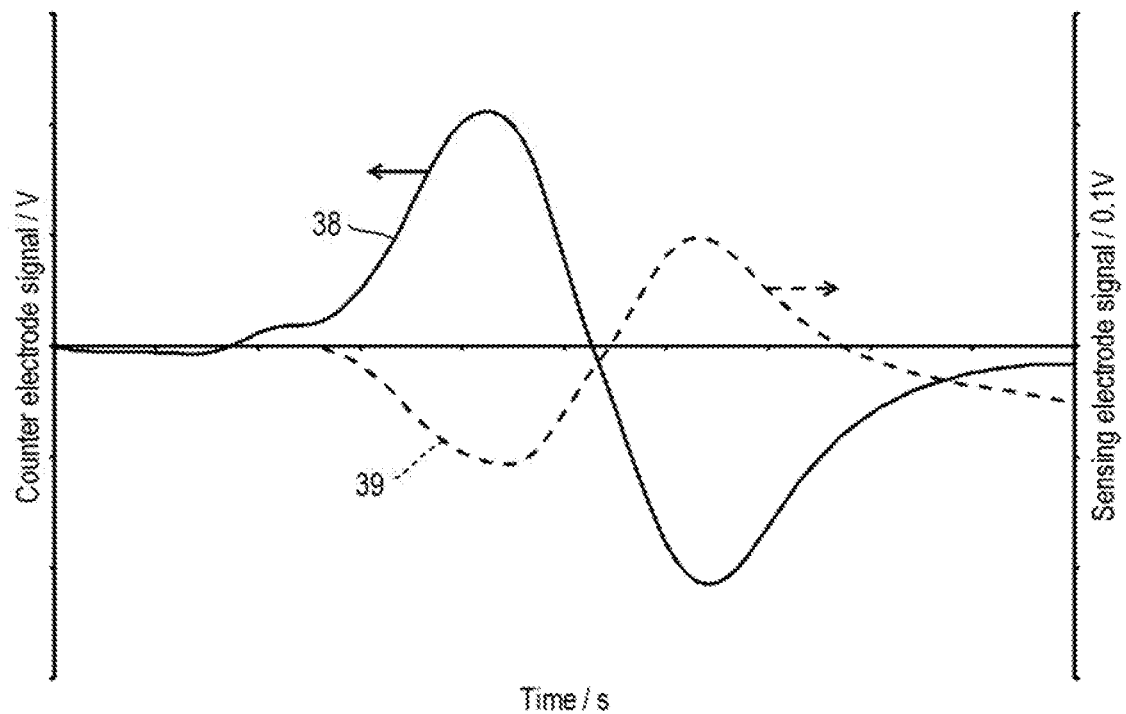
FIG. 14 shows measured signals corresponding to piezoelectric induced charges on a sensing electrode and a common electrode.

Referring also to FIG. 14, experimental data illustrating piezoelectric induced charges on a sensing electrode $x_n$, $y_m$ and the common electrode are is shown.

The first and second voltage signals 38, 39 correspond respectively to the common electrode 15 and a sensing electrode $x_n$, $y_m$ in the same way as FIG. 13. However, the data shown in FIG. 14 was captured in response to tapping the touch panel 10 using a non-conductive object, in order to generate piezoelectric pressure signals which are substantially free of noise from external electric fields.

It may be observed that in FIG. 14, the first and second voltage signals 38, 39 have opposite signs (in other words the signals have substantially opposite polarities at a given time).

The observed polarities do not precisely correspond to the ideal case in either of FIGS. 38, 39, which is thought to be as a result of small variations in DC offsets and other sources of measurement error.

Second apparatus: Apparatuses for combined capacitance and pressure sensing have been described in WO 2016/102575 A2, in particular with reference to FIGS. 22 to 26 of this document.

Figure 15:
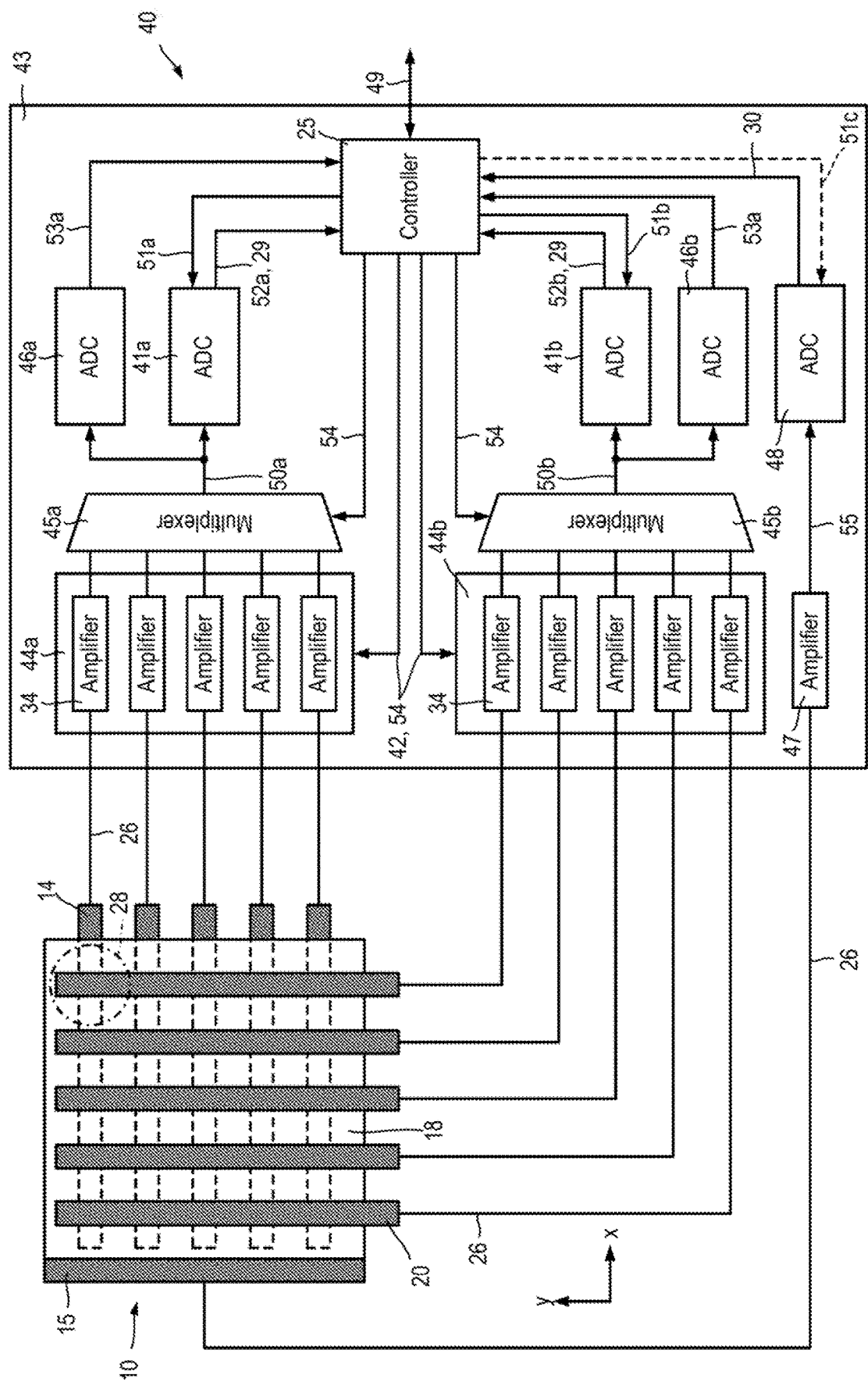
FIG. 15 illustrates a second apparatus for piezoelectric pressure measurements.

In order to aid understanding of the second apparatus 40 (FIG. 15 of the present specification, it may be helpful to briefly discuss the operation of apparatuses for combined capacitance and pressure sensing as described in WO 2016/102975 A2. The discussion hereinafter is made with reference to the structure of the first touch panel 10 of the present specification.

The layer of piezoelectric material 16 is poled. Consequently, the pressure applied by a user interaction will cause a strain which induces a polarisation P of the layer of piezoelectric material 16. The polarisation P of the layer of piezoelectric material 16 results in an induced electric field $E_p$, which has a component $E_z$ the thickness direction. The deformation which produces the polarisation P may result from a compression or a tension. The deformation which produces the polarisation P may be primarily an in-plane stretching of the piezoelectric material layer 16 in response to the applied pressure of a user interaction.

The induced electric field $E_p$ produces a potential difference between the common electrode 15 and any one of the sensing electrodes 14, 20. Electrons flow on or off the electrodes 14, 15, 20 until the induced electric field $E_p$ is cancelled by an electric field $E_q$ produced by the charging of the electrodes 14, 15, 20. In other words, the electric field $E_q$ results from the charges $Fx_n$, $Fy_m$, $F_{CE}$.

When the touch panel 10 is used for combined capacitance and pressure sensing, signals received from the sensing electrodes 14, 20 generally take the form of a superposition of a piezoelectric signal pressure signal and an applied or sensed capacitance measurement signal. Apparatuses for combined capacitance and pressure sensing as described in WO 2016/102975 A2, in particular with reference to FIGS. 22 to 26, operate by using first and second frequency dependent filters (not shown) to separate signals received from the sensing electrodes 14, 20 into a first component including capacitance information and a second component including piezoelectric pressure information. The first and second frequency dependent filters (not shown) may be physical filters, or may be applied during digital signal processing. This is possible because piezoelectric pressure signals and capacitance measurement signals generally have different, separable frequency contents.

For example, mutual capacitances between a pair of sensing electrodes 14, 20 may typically fall within the range of 0.1 to 3000 pF or more, and preferably 100 to 2500 pF.

In order to effectively couple to capacitances in this range, a capacitance measurement signal may typically have a base frequency of greater than or equal to 10 kHz, greater than or equal to 20 kHz, greater than or equal to 50 kHz or greater than or equal to 100 kHz. By contrast, piezoelectric pressure signals typically include a broadband frequency content spanning a range from several Hz to several hundreds or thousands of Hz. This is at least in part because piezoelectric pressure signals arise from user interactions by a human user.

Referring also to FIG. 15, a second apparatus 40, for combined capacitance and differential piezoelectric pressure measurements, is shown.

In the apparatuses described in WO 2016/102975 A2, the first and second frequency dependent filters (not shown) are implemented in hardware as a part of front end modules, or in the digital domain, for example by a controller. By contrast, the second apparatus 40 of the present specification implements first frequency dependent filters to select the first piezoelectric pressure signals 29 using analog-to-digital converters (ADC) 41a, 41b which are synchronised with a capacitance measurement signal 42 at a first sampling frequency $f_{piezo}$. The second apparatus 40 implements a second frequency dependent filter in the digital domain to obtain capacitance signals 27. For example, by application of a digital high-pass filter, or by using the more recently sample value, or values, of the first piezoelectric pressure signals 29 to provide a baseline.

The second apparatus 40 includes a first touch panel 10 and a touch controller 43 for combined capacitance and differential pressure sensing. The second apparatus 40 may be incorporated into an electronic device (not shown) such as, for example, a mobile telephone, a tablet computer, a laptop computer and so forth. The first touch panel 10 may be bonded overlying the display (not shown) of an electronic device (not shown). In this case, the materials of the first touch panel 10 should be substantially transparent. A cover lens (not shown) may be bonded overlying the first touch panel 10. The cover lens (not shown) is preferably glass but may be any transparent material.

The touch controller 43 includes a controller 25. The touch controller 43 also includes a first circuit 23 including a pair of amplifier modules 44a, 44b a pair of multiplexers 45a, 45b, a pair of primary ADCs 41a, 41b and a pair of secondary ADCs 46a, 46b. The touch controller also includes a second circuit 24 including a common electrode charge amplifier 47 and a common electrode ADC 48. The controller 25 may communicate with one or more processors (not shown) of an electronic device (not shown) using a link 49. The controller 25 includes a signal source (not shown) for providing a driving capacitance measurement signal 42, $V_{sig}(t)$ (FIG. 16, also referred to as "driving signal" for brevity hereinafter) to one or both of the amplifier modules 44a, 44b).

The second apparatus 40 will be described with reference to an example in which the driving signal 42, $V_{sig}(t)$ is supplied to the first amplifier module 44a, such that the first sensing electrodes 14 are transmitting, Tx electrodes, and the second sensing electrodes 20 are receiving, Rx electrodes.

Each amplifier module 44a, 44b includes a number of separate charge amplifiers 34. Each charge amplifier 34 of the first amplifier module 44a is connected to a corresponding first sensing electrode 14 via a conductive trace 26. The output of each charge amplifier 34 of the first amplifier module 44a is connected to a corresponding input of the first multiplexer 45a. In this way, the first multiplexer 45a may output an amplified signal 50a corresponding to an addressed first sensing electrode 14.

The first primary ADC 41a receives the amplified signal 50a corresponding to a presently addressed first sensing electrode 14 from the first multiplexer 45a output. The amplified signal 50a corresponding to a presently addressed first sensing electrode 14 includes a superposition of the driving signal 42, $V_{sig}(t)$ and a piezoelectric pressure signal 29, $V_{piezo}(t)$. The first primary ADC 41a also receives a first synchronisation signal 51a from the controller 25 (also referred to as a "clock signal"). The first synchronisation signal 51a triggers the first primary ADC 41a to obtain samples at a first sampling frequency $f_{piezo}$ and at times corresponding to the amplitude of the driving signal 42, $V_{sig}(t)$ being substantially equal to a ground, common mode or minimum value. In this way, the first primary ADC 41a may obtain a first filtered signal 52a in the form of a sampled signal which corresponds approximately to a piezoelectric pressure signal 29, $V_{piezo}(t)$ generated by the first sensing electrode 14 connected with the first multiplexer 45a. The first synchronisation signal 51a need not trigger the first primary ADC 41a to obtain samples during every single period of the driving signal 42, $V_{sig}(t)$, and instead may trigger the first primary ADC 41a to obtain samples during, for example, every other period, every tenth period, every hundredth period and so forth.

Figure 16A:
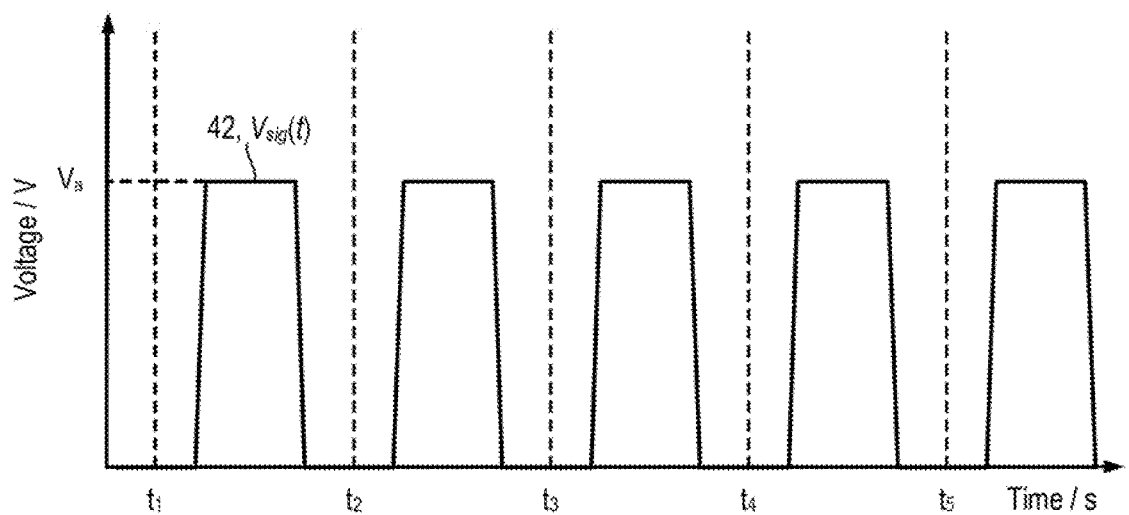
FIGS. 16A to 16C illustrate separating superposed capacitive and piezoelectric pressure signals using an analog-to-digital convertor synchronised to a driving signal.
Figure 16B:
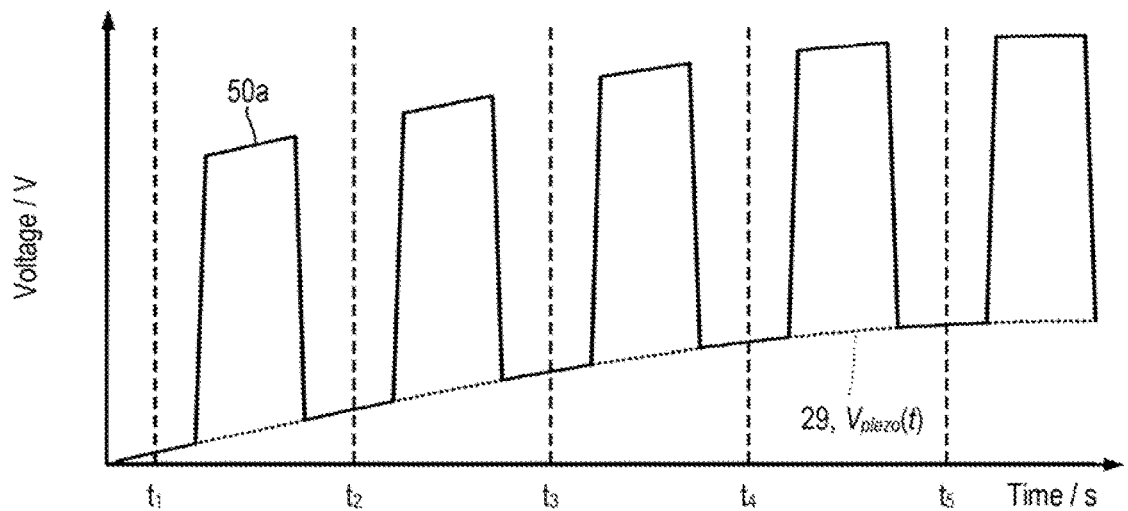
Figure 16C:
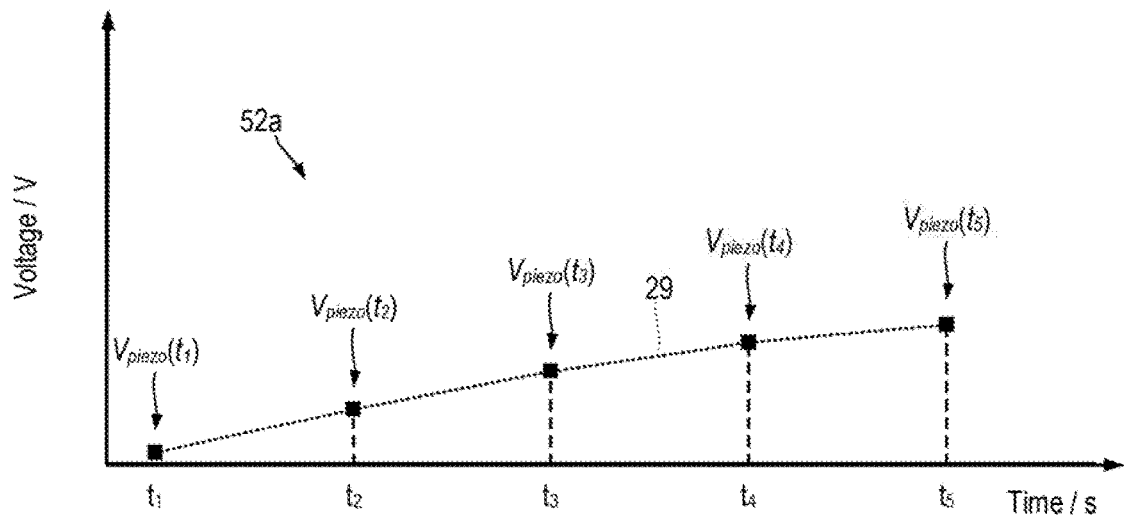

For example, referring also to FIGS. 16A to 16C, an example of obtaining a piezoelectric pressure signal 29 in the form of the first filtered signal 52a is illustrated.

For visual purposes, in FIGS. 16A to 16C, the driving signal 42, $V_{sig}(t)$ and a superposed piezoelectric pressure signal 29, $V_{piezo}(t)$ have been illustrated with much smaller disparities in frequency and amplitude than would be expected in practice. In practice, the driving signal 42, $V_{sig}(t)$ would be expected to have a significantly larger amplitude and to vary at a frequency several orders of magnitude larger than the piezoelectric pressure signal 29, $V_{piezo}(t)$.

Referring in particular to FIG. 16A, an example of a driving signal 42, $V_{sig}(t)$ of base frequency $f_d$ may take the form a pulsed wave with a 50:50 duty ratio and a period of $1/f_d$. In this example, the first synchronisation signal 51a triggers the first primary ADC 41a at approximately the midpoint of the driving signal 42, $V_{sig}(t)$ minimum, or zero, period. For example, the first primary ADC 41a may obtain a sample at times $t_1$, $t_2 = t_1 + 1/f_d$, $t_3 = t_1 + 2/f_d$ and so forth.

Referring in particular to FIG. 16B, with the first sensing electrodes 14 acting as transmitter electrodes, Tx, and the second sensing electrodes 20 acting as receiving electrodes, Rx, the amplified signal 50a may be approximated as a superposition of a piezoelectric pressure signal 29, $V_{piezo}(t)$ and the driving signal 42 $V_{sig}(t)$. The first synchronisation signal 51a triggers sampling of the amplified signal 50a at times when the contribution of the driving signal 42, $V_{sig}(t)$ to the amplified signal 50a is substantially equal to a ground, common mode or minimum value. In this way, a sampling of substantially only the piezoelectric pressure signal 29, $V_{piezo}(t)$ may be obtained.

Referring in particular to FIG. 16C, the first filtered signal 52a then takes the form of a sequence of samplings of the piezoelectric pressure signal 29, $V_{piezo}(t)$ at times $t_1$, $t_2$, $t_3$ and so forth.

The first secondary ADC 46a receives the amplified signal 50a corresponding to a presently addressed first sensing electrode 14 from the first multiplexer 45a output. The first secondary ADC 46a samples the amplified signal 50a at a sampling frequency $f_{cap}$, which is at least several times the base frequency $f_d$ of the driving signal 42, $V_{sig}(t)$. The first secondary ADC 46a outputs a digitised amplified signal 53a to the controller 25. The controller 25 receives the digitised amplified signal 53a and applies a digital high pass filter to obtain a second filtered signal in the digital domain. The second filtered signal corresponds to capacitance signals 27.

Alternatively, since the piezoelectric pressure signal 29, $V_{piezo}(t)$ typically varies at frequencies several orders of magnitude lower than the base frequency $f_d$ of the driving signal 42, $V_{sig}(t)$, the controller 25 may treat the most recently sampled value of the first filtered signal 52a, for example $V_{piezo}(t_3)$, as an additional offset and subtract this value from the digitised amplified signal 53a. More accurate baseline corrections may be employed, for example, linear interpolation based on the two most recent sampled values of the first filtered signal 52a, or quadratic interpolation based on the three most recently sampled values of the first filtered signal 52a.

The primary and secondary ADCs 41a, 46a may be the same. However, it may be advantageous for the primary and secondary ADCs 41a, 46a to be different. In particular, the primary ADC 41a may be optimised for the dynamic range of the piezoelectric pressure signals 29, $V_{piezo}(t)$, without the need to measure the larger amplitudes corresponding to the driving signal $V_{sig}(t)$. Furthermore, because the first sampling frequency $f_{piezo}$ should be at most equal to the base frequency $f_d$ of the capacitance measurement signal 42, $V_{sig}(t)$, a lower bandwidth is required for the primary ADC 41a compared to the secondary ADC 46a. For cost sensitive applications, this enables use of cheaper, ADCs for the primary ADC 41a. By contrast, for performance applications, this enables the use of more precise ADCs capable of differentiating a larger number of signal levels within the same dynamic range (a 16-bit ADC is typically slower than an 8-bit ADC all else being equal).

The processing of signals from the second sensing electrodes 20 is similar to that of signals from the first sensing electrodes 14, except that because the second sensing electrodes 20 are the receiving, Rx electrodes, a second synchronisation signal 51b for the second primary ADC 41b may be offset with respect to the first synchronisation signal 51a.

Each charge amplifier 34 of the second amplifier module 44b is connected to a corresponding second sensing electrode 20 via a conductive trace 26, and the output of each charge amplifier 34 of the second amplifier module 44b is connected to a corresponding input of the second multiplexer 45b. In this way, the second multiplexer 45b may output an amplified signal 50b corresponding to an addressed second sensing electrode 20.

The amplified signal 50b corresponding to a presently addressed second sensing electrode 20 includes a superposition of a received capacitance measurement signal (not shown) $V_{meas}(t)$ and a piezoelectric pressure signal 29, $V_{piezo}(t)$. The received capacitance measurement signal $V_{meas}(t)$ (referred to as a "received signal" for brevity hereinafter) is the driving signal 42, $V_{sig}(t)$ as coupled to the addressed second sensing electrode 20 by a mutual capacitance between the addressed second sensing electrode 20 and a first sensing electrode 14. The received signal $V_{meas}(t)$ is related to and has a similar form to the driving signal 42, $V_{sig}(t)$, and in particular has substantially the same frequency contents. However, the received signal $V_{meas}(t)$ may include a change in amplitude and/or a change in phase compared to the driving signal $V_{sig}(t)$. The second primary ADC 41b receives a second synchronisation signal 51b from the controller 25 (also referred to as a "clock signal"). The second synchronisation signal 51b triggers the second primary ADC 41b to obtain samples at the sampling frequency $f_{piezo}$ and at times corresponding to the amplitude of the received signal $V_{meas}(t)$ being substantially equal to a ground, common mode or minimum value. Depending on the form of the driving signal 42, $V_{sig}(t)$ and the typical phase shifts between driving signals 42, $V_{sig}(t)$ and the received signals $V_{meas}(t)$, there are several possible relationships between the first and second synchronisation signals 51a, 51b.

When the received signal $V_{meas}(t)$ is approximately in phase with the driving signal 42, $V_{sig}(t)$, the second synchronisation signal 51b may be the same as the first synchronisation signal 51a. The second synchronisation signal 51b will trigger sampling of the amplified signal 50b at times when the contribution of the received signal $V_{meas}(t)$ to the amplified signal 50b is substantially equal to a ground, common mode or minimum value. In this way, a sampling of substantially only the piezoelectric pressure signal 29, $V_{piezo}(t)$ may be obtained.

Similarly, for a driving signal 42, $V_{sig}(t)$ in the form of a pulsed wave as shown in FIG. 16A, small phase shifts φ of up to about φ±π/2 between the received signal $V_{meas}(t)$ and the driving signal 42, $V_{sig}(t)$ may be accommodated without requiring any offset between the first and second synchronisation signals 51a, 51b. For a pulsed wave, such phase shifts can be tolerated because the driving signal 42, $V_{sig}(t)$ and received signal $V_{meas}(t)$ are each substantially equal to zero for half of each period.

For larger phase shifts φ or different, non-square, waveforms of the driving signal 42, $V_{sig}(t)$, the second synchronisation signal 51b may be offset with respect to the first synchronisation signal 51a such that, within the range of capacitances expected/measured for the corresponding touch panel 10, the second synchronisation signal 51b triggers the second primary ADC 41b during a period of low or zero signal level of the received signal $V_{meas}(t)$. In other words, the second synchronisation signal 51b may synchronise the sampling of the second primary ADC 41b to the received signal $V_{meas}(t)$, instead of the driving signal 42, $V_{sig}(t)$.

Alternatively, the second synchronisation signal 51b could be generated in response to a condition on the received signal $V_{meas}(t)$. For example, a simple comparator circuit could be used to generate the second synchronisation signal 51b in response to the received signal $V_{meas}(t)$ dropping to within a pre-calibrated range of ground, common mode or a minimum value. A circuit triggering the second synchronisation signal 51b may include a delay timer.

In this way, the second primary ADC 41b may obtain a second filtered signal 52b in the form of a sampled signal which corresponds approximately to a piezoelectric pressure signal 29, $V_{piezo}(t)$ generated by the second sensing electrode 20 connected via the second multiplexer 45b. The second synchronisation signal 51b need not trigger the second primary ADC 41b to obtain samples during every single period of the driving signal 42, $V_{sig}(t)$ or measured signal $V_{meas}(t)$, and instead may trigger the second primary ADC 41b to obtain samples during, for example, every other period, every tenth period, every hundredth period and so forth.

The controller 25 may also provide a secondary synchronisation signal 54 to the multiplexers 45a, 45b and/or amplifiers 34. The second synchronisation signal 54 may cause the multiplexers 45a, 45b to address each combination of first and second sensing electrodes 14, 20 according to a sequence determined by the controller 25. In this way, the touch controller 25 may receive amplified signals 50a, 50b from each pairing of first and second sensing electrodes 14, 20 according to a sequence determined by the controller 25. The sequence may be pre-defined, for example, the sequence may select each pair of a first sensing electrode 14 and a second sensing electrode 20 once before repeating. The sequence may be dynamically determined, for example, when one or more user interactions are detected, the controller 25 may scan the subset of first and second sensing electrodes 14, 20 adjacent to each detected user interaction in order to provide faster and/or more accurate tracking of user touches.

The common electrode charge amplifier 47 receives signals from the common electrode 15 and generates a common electrode amplified signal 55. The common electrode ADC 48 receives the common electrode amplified signal 55 and samples it at the piezoelectric sampling frequency $f_{piezo}$ to generate the second piezoelectric signal 30. Optionally, the common electrode ADC 48 is also synchronised by a third synchronisation signal 51c, which may be identical to or offset from the first synchronisation signal, so as to sample the second piezoelectric signal 30 at times corresponding to ground, common mode or a minimum value of the driving signal 42, $V_{sig}(t)$ and/or ground, common mode or a minimum value the received signal $V_{means}(t)$. Synchronisation of the common electrode ADC 48 may help to reduce or avoid cross-talk from the capacitance measurements.

Based on the obtained filtered signals 52a, 52b the controller 25 may calculate external interference signal values 32a, 32b corresponding to the addressed first and second sensing electrodes 14, 20. The external interference signal values 32a, 32b are determined based on the first and second piezoelectric pressure signals 29, 30, using the methods described hereinbefore. The external interference signal values 32a, 32b may be output via the link 49.

As mentioned hereinbefore, the controller 25 provides the driving signal 42, $V_{sig}(t)$ to each amplifier 34 of the first amplifier module 44a. An input of each amplifier 34 of the first amplification module 44a may be used to drive the corresponding first sensing electrode 14 of the first touch panel 10 using the driving signal 42, $V_{sig}(t)$. Based on the driving signal 42, $V_{sig}(t)$ and the first and second digitised amplified signals 53a, 53b obtained by the controller 25, the controller 25 calculates capacitance values 27 and/or touch data 31 based on the mutual-capacitance between the addressed first and second sensing electrodes 14, 20. The capacitance values 27 and/or touch data 31 may be output via the link 49.

Figure 17:
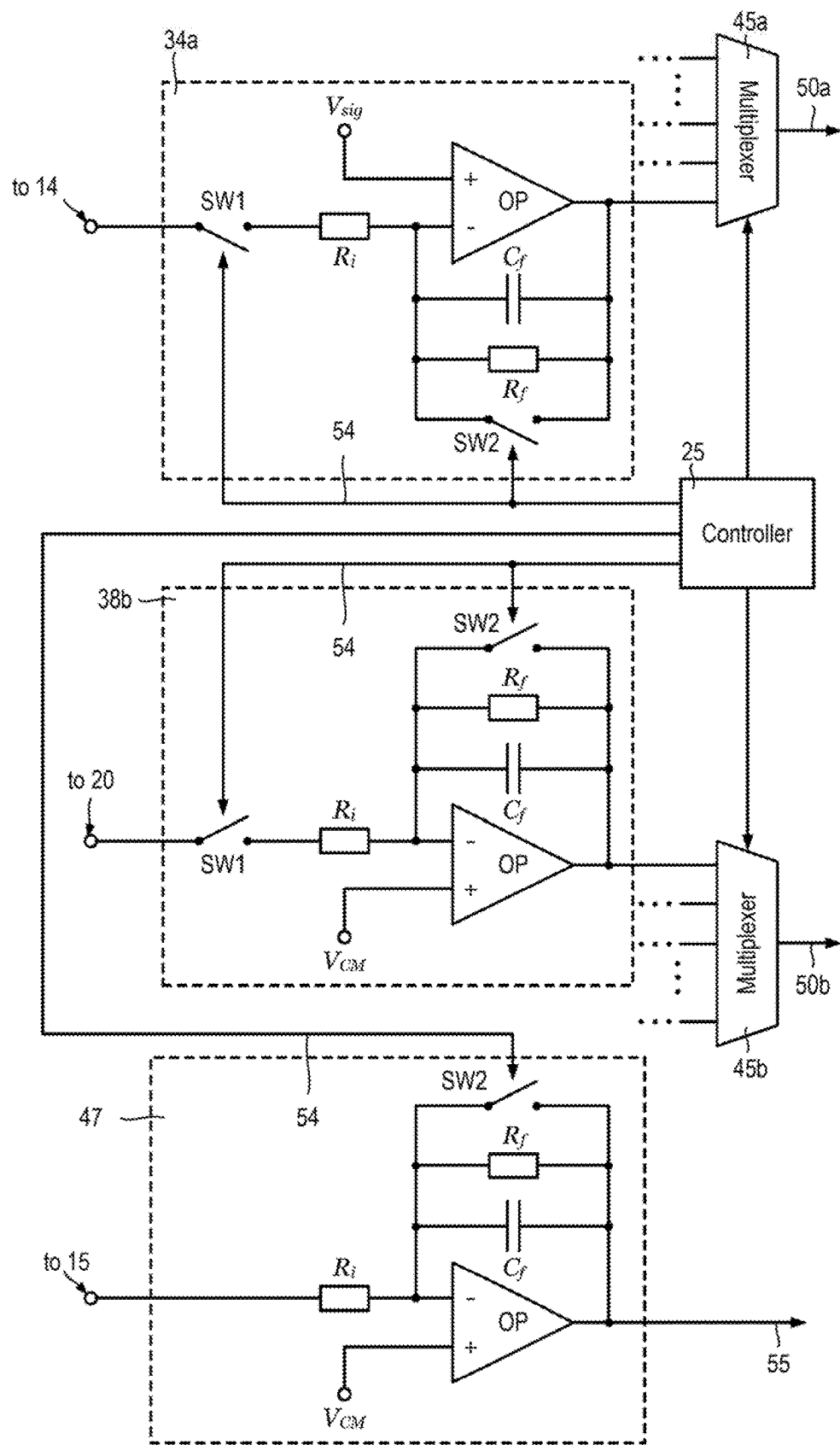
FIG. 17 illustrates an exemplary configuration of charge amplifiers for piezoelectric pressure measurements.

Referring also to FIG. 17, an example of one configuration of charge amplifiers 34a, 34b, 47 suitable for use in the second apparatus 40 is shown.

In one configuration, each charge amplifier 34a, 34b, 47 includes an operational amplifier OP having an inverting input, a non-inverting input and an output.

For example, each charge amplifier 34a forming part of the first amplifier module 44a includes an operational amplifier OP having an inverting input for coupling to a corresponding first sensing electrode 14 via an input resistance $R_i$ and a first switch SW1 connected in series. The non-inverting input of the operational amplifier OP is connected to the driving signal 42, $V_{sig}(t)$. The driving signal 42, $V_{sig}(t)$ may be provided by the controller 25, by a separate module (not shown) of the second apparatus 40 or may be received into the second apparatus 40 from an external source. Since the inverting input will be at practically the same voltage as the non-inverting input, the inverting input can be caused to drive the corresponding first sensing electrode 14. A feedback network of the charge amplifier 34a includes a feedback resistance $R_f$, a feedback capacitance $C_f$ and a second switch SW2 connected in parallel between the inverting input and the output of the operational amplifier OP. The output of the operational amplifier OP provides the amplified signal 50a.

Each charge amplifier 34b forming part of the second amplifier module 44b is the same as each charge amplifier 34a of the first amplifier module 44a, except that the non-inverting input of the operational amplifier OP is coupled to a common mode voltage $V_{CM}$ instead of the driving signal 42, $V_{sig}(t)$, and in that the inverting input is connected to a second sensing electrode 20 instead of a first sensing electrode 14.

The common electrode charge amplifier 47 is the same as the charge amplifiers 34b forming part of the second amplifier module 44b, except that the inverting input of the common electrode charge amplifier 47 is connected to the common electrode 15 and the common electrode charge amplifier 47 omits the first switch SW1.

Other terminals of the operational amplifiers OP, such as power supply terminals, may be present, but are not shown in this or other schematic circuit diagrams described herein.

The second switches SW2 permit the corresponding feedback capacitors $C_f$ to be discharged. The opening and closing of the second switches SW2 may be governed by the secondary synchronisation signal 54 provided by the controller 25. In this way, the feedback capacitors $C_f$ of each charge amplifier 34a, 34b may be periodically discharged in order to reset the feedback network of the operational amplifier OP to prevent excessive drift. Optionally, the second switch SW2 of the common electrode charge amplifier 47 may also be synchronised using the second synchronisation signal 54.

The first switches SW1 may be controlled by the second synchronisation signal 54 provided by the controller 25 to enable an amplifier 34a, 34b to be connected or disconnected from the corresponding sensing electrode 14, 20 if required.

The first sensing electrodes 14 need not be transmitting, Tx electrodes and the second sensing electrodes 20 receiving, Rx electrodes. Alternatively, the controller 25 may provide the driving signal 42, $V_{sig}(t)$ to the second amplifier module 44b so that the second sensing electrodes 20 are transmitting, Tx electrodes and the received signals $V_{meas}(t)$ are detected using the first sensing electrodes 14.

In other examples, the second apparatus 40 need not be configured for mutual capacitance measurements, and may instead be configured to measure self-capacitances of each first and second sensing electrode 14,20. In this case, a self-capacitance measurement signal (not shown) may be provided to both the first and second amplifier modules 44a, 44b.

Second touch panel: In the first touch panel 10, the first and second sensing electrodes 14, 20 have been shown in the form of elongated rectangular electrodes. However, other shapes may be used.

Figure 18:
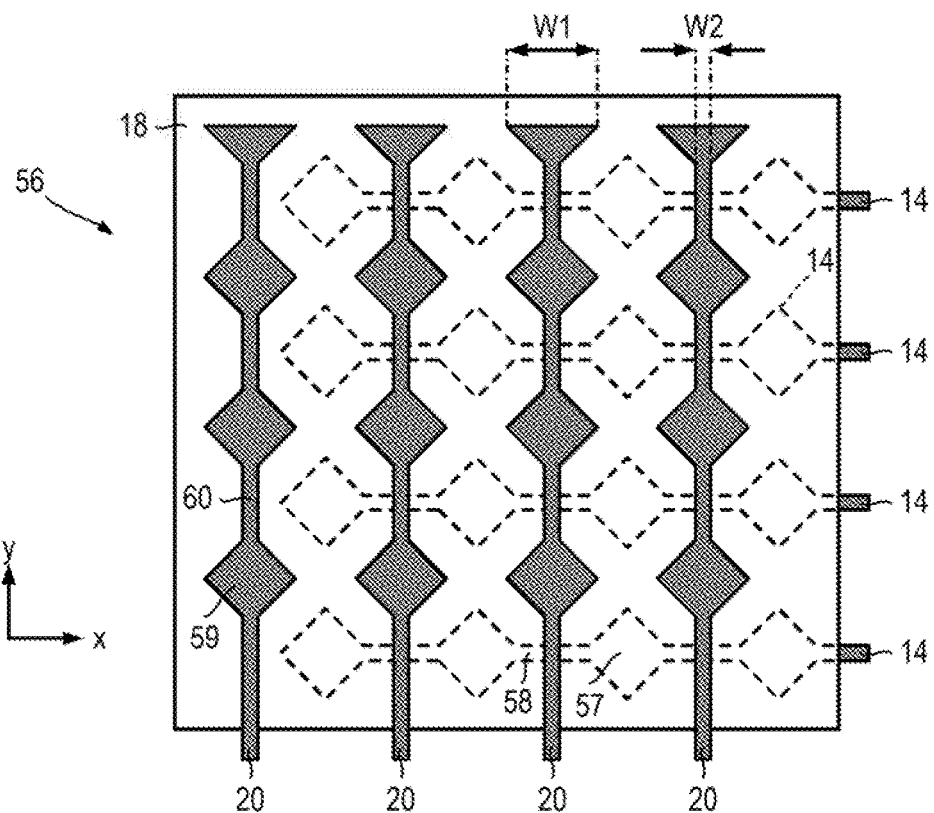
FIG. 18 is a plan view of a second touch panel for piezoelectric pressure measurements.

Referring also to FIG. 18, a second touch panel 56 having an alternative geometry of the first and second sensing electrodes 14, 20 is shown.

Instead of being rectangular, each first sensing electrode 14 may include several pad segments 57 evenly spaced in the first direction x and connected to one another in the first direction x by relatively narrow bridging segments 58. Similarly each second sensing electrode 20 may comprise several pad segments 59 evenly spaced in the second direction y and connected to one another in the second direction y by relatively narrow bridging segments 60. The pad segments 57 of the first sensing electrodes 14 are diamonds having a first width W1 in the second direction y and the bridging segments 58 of the first sensing electrodes 14 have a second width W2 in the second direction y. The pad segments 59 and bridging segments 60 of the second sensing electrodes 20 have the same respective shapes and widths W1, W2 as the first sensing electrodes 14.

The first and second sensing electrodes 14, 20 are arranged such that the bridging segments 60 of the second sensing electrodes 20 overlie the bridging segments 58 of the first sensing electrodes 14. Alternatively, the first and second sensing electrodes 14, 20 may be arranged such that the pad segments 59 of the second sensing electrodes 20 overlie the pad segments 57 of the first sensing electrodes 14. The pad segments 57, 59 need not be diamond shaped, and may instead be circular. The pad segments 57, 59 may be a regular polygon such as a triangle, square, pentagon or hexagon. The pad segments 57,59 may be I shaped or Z shaped.

The alternative geometry of the second touch panel 56 is equally applicable in combination with the first or second apparatus 22, 40.

Third touch panel: Referring also FIG. 19, a third touch panel 61 may be used in combination with the first or second apparatus 22, 40.

The third touch panel 61 is substantially the same as the first touch panel 10 except that the third touch panel 61 does not include the second layer structure 17 and the second sensing electrodes 20 are disposed on the first face 12 of the first layer structure 11 in addition to the first sensing electrodes 14. Each first sensing electrode 14 is a continuous conductive region extending in the first direction x. For example, each first sensing electrode 14 may include several pad segments 62 evenly spaced in the first direction x and connected to one another in the first direction x by relatively narrow bridging segments 63. Each second sensing electrode 20 may comprise several pad segments 64 evenly spaced in the second direction y. However, the pad segments 64 of the second sensing electrodes 20 are disposed on the first face 12 of the first layer structure 11 and are interspersed with, and separated by, the first sensing electrodes 14. The pad segments 64 corresponding to each second sensing electrode 20 are connected together by conductive jumpers 65. The jumpers 65 each span a part of a first sensing electrode 14 and the jumpers 65 are insulated from the first sensing electrodes 14 by a thin layer of dielectric material (not shown) which may be localised to the area around the intersection of the jumper 65 and the first sensing electrode 14.

Alternatively, a thin dielectric layer (not shown) may overlie the first face 12 of the first layer structure 11, the first sensing electrodes 14 and the conductive pads 64 of the second sensing electrodes 20. Conductive traces (not shown) extending in the second direction y may be disposed over the dielectric layer (not shown), each conductive trace (not shown) overlying the pad segments 64 making up one second sensing electrode 20. The overlying conductive traces (not shown) may connect the pad segments 64 making up each second sensing electrode 20 using vias (not shown) formed through the thin dielectric layer (not shown).

MODIFICATIONS

It will be appreciated that many modifications may be made to the embodiments hereinbefore described. Such modifications may involve equivalent and other features which are already known in the design, manufacture and use of pressure and/or projected capacitance sensing touch panels and which may be used instead of or in addition to features already described herein. Features of one embodiment may be replaced or supplemented by features of another embodiment.

Figure 20:
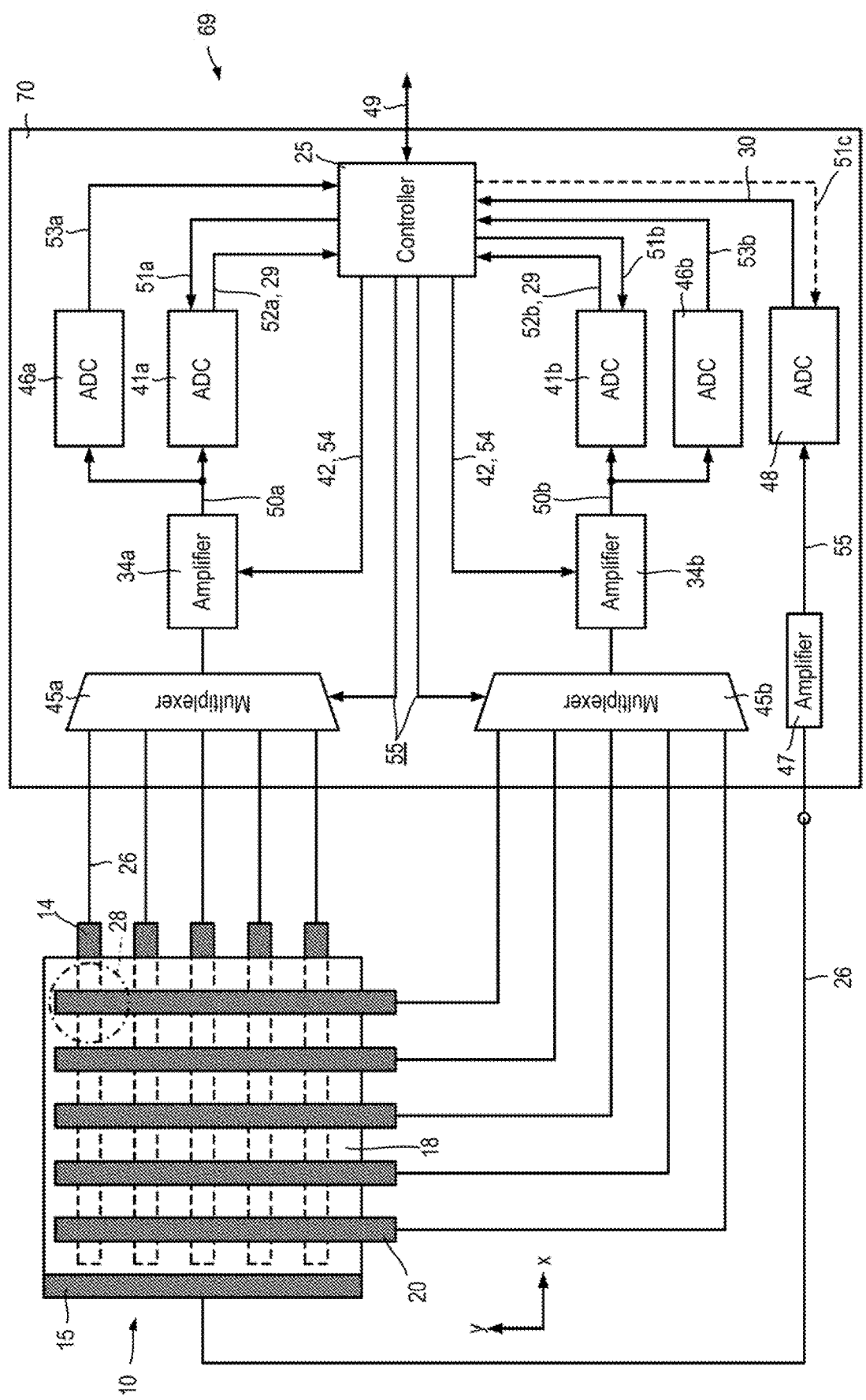
FIG. 20 illustrates a third apparatus for piezoelectric pressure measurements.

Third apparatus: Referring also to FIG. 20, a third apparatus 69 includes the first touch panel 10 and a second controller 70 for combined pressure and capacitance sensing.

The second controller 70 is the same as the first controller 43, except that in the second controller 70 the input signals from a first sensing electrode 14 are connected to a single charge amplifier 34a by a first multiplexer 45a. The charge amplifier 34a outputs the first amplified signal 50a, which is processed by the first primary ADC 41a, the first secondary ADC 46a and the controller 25 in the same way as for the first controller 43. Similarly, the input signals from a second sensing electrode 20 are connected to a single charge amplifier 34b by a second multiplexer 45b. The charge amplifier 34b outputs the second amplified signal 50b, which is processed by the second primary ADC 41b, the second secondary ADC 46b and the controller 25 in the same way as for the first controller 43. The acquisition and processing of signals from the common electrode 15 is the same as for the second apparatus 40.

In the same way as the first controller 43, use of primary and secondary ADCs 41, 46 is not essential. Instead, a single ADC (not shown) which is capable of alternating operation at the piezoelectric and capacitive sampling frequencies $f_{piezo}$, $f_{cap}$, so as to obtain the signals 52, 53 sequentially.

Although the examples described hereinbefore have been primarily described with reference to combined piezoelectric and capacitive touch panels and apparatus, it should be appreciated that the methods of the specification may also be used in a touch panel apparatus which does not measure capacitances and which only measures piezoelectric pressure signals.

Although in the examples described hereinbefore a first piezoelectric pressure signal 29 is generated corresponding to each first or second sensing electrode 14, 20, this need not be the case. In other examples, signals from a group of two or more adjacent sensing electrodes 14, 20 may be combined by a single charge amplifier 34, to produce a first piezoelectric pressure signal 29 corresponding to the charge induced on the group of two or more adjacent sensing electrodes 14, 20.

Although the examples described hereinbefore have been primarily described with reference to touch panels in which first and second sensing electrodes 14, 20 are elongated in perpendicular directions, this need not be the case. In other examples, the second sensing electrodes 20 may be omitted and the first sensing electrodes may take the form of a two dimensional array of discrete touch panels. The first and second methods of the present specification may still be used with such examples.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. An apparatus for processing signals from a touch panel, the touch panel comprising a layer of piezoelectric material disposed between a plurality of sensing electrodes and at least one common electrode, the apparatus comprising:
   a first circuit for connection to the plurality of sensing electrodes and configured to generate a plurality of first pressure signals, wherein each first pressure signal corresponds to one or more sensing electrodes and is indicative of a pressure acting on the touch panel proximate to the corresponding one or more sensing electrodes;
   a second circuit for connection to the at least one common electrode and configured to generate a second pressure signal indicative of a total pressure applied to the touch panel; and,
   a controller configured:
   to determine an external interference signal based on a weighted sum over the second pressure signal and the plurality of first pressure signals;
   to compare the external interference signal against a pre-calibrated threshold, and in response to the external interference signal being greater than or equal to the pre-calibrated threshold, to output an interference flag indicating that the first and second pressure signals are influenced by coupling to one or more external electrical fields.

2. An apparatus according to claim 1, wherein the controller is further configured to determine a location at which pressure is applied to the touch panel; and
in response to the interference flag being set, to process the first and/or second pressure signals using a signal post-processing method configured to reduce or remove the influence of coupling to one or more external electrical fields.

3. An apparatus according to claim 2, wherein processing the first and/or second pressure signals using a signal post-processing method configured to reduce or remove the influence of coupling to one or more external electrical fields comprises identifying one or more sensing electrodes which are proximate to the location, and excluding the identified sensing electrodes from calculations to determine the total pressure.

4. An apparatus according to claim 3, wherein the controller is further configured to estimate one or more pressures acting on the touch panel proximate to the one or more excluded sensing electrodes, based on the remaining non-excluded sensing electrodes.

5. An Apparatus according to claim 1, wherein the first circuit is configured to generate, for each sensing electrode, a capacitance signal indicative of a capacitance of the sensing electrode;
   wherein the controller is configured to determine a location at which pressure is applied to the touch panel based on the capacitance signals.

6. An apparatus according to claim 5, wherein generating the first pressure signals and the capacitance signals comprises separating single signals received from the sensing electrodes.

7. A touch panel system comprising:
   a touch panel comprising a layer of piezoelectric material disposed between a plurality of sensing electrodes and at least one common electrode; and,
   an apparatus for processing signals from the touch panel, the apparatus comprising:
      a first circuit for connection to the plurality of sensing electrodes and configured to generate a plurality of first pressure signals, wherein each first pressure signal corresponds to one or more sensing electrodes and is indicative of a pressure acting on the touch panel proximate to the corresponding one or more sensing electrodes;
      a second circuit for connection to the at least one common electrode and configured to generate a second pressure signal indicative of a total pressure applied to the touch panel; and,
      a controller configured:
      to determine an external interference signal based on a weighted sum over the second pressure signal and the plurality of first pressure signals, to compare the external interference signal against a pre-calibrated threshold, and, in response to the external interference signal being greater than or equal to the pre-calibrated threshold, to output an interference flag indicating that the first and second pressure signals are influenced by coupling to one or more external electrical fields.

8. An electronic device comprising a touch panel system according to claim 7.

9. A method of processing signals from a touch panel, the touch panel comprising a layer of piezoelectric material disposed between a plurality of sensing electrodes and at least one common electrode, the method comprising:
   generating a plurality of first pressure signals, each first pressure signal based on signals received from one or more sensing electrodes, and each first pressure signal indicative of a pressure acting on the touch panel proximate to the corresponding one or more sensing electrodes;
   generating, based on signals received from the at least one common electrode, a second pressure signal indicative of a total pressure applied to the touch panel;
   determining an external interference signal based on a weighted sum over the second pressure signal and the plurality of first pressure signals;
   comparing the external interference signal against a pre-calibrated threshold, and in response to the external interference signal being greater than or equal to the pre-calibrated threshold, outputting an interference flag indicating that the first and second pressure signals are influenced by coupling to one or more external electrical fields.

10. A method according to claim 9, further comprising determining a location at which pressure is applied to the touch panel;
in response to the interference flag being set, processing the first and/or second pressure signals using a signal post-processing method configured to reduce or remove the influence of coupling to one or more external electrical fields.

11. A method according to claim 10, wherein processing the first and/or second pressure signals using a signal post-processing method configured to reduce or remove the influence of coupling to one or more external electrical fields comprises identifying one or more sensing electrodes which are proximate to the location, and excluding the identified sensing electrodes from subsequent calculations to determine the total pressure.

12. A method according to claim 11, further comprising estimating one or more pressures acting on the touch panel proximate to the one or more excluded sensing electrodes, based on the remaining non-excluded sensing electrodes.

13. A method according to claim 9, comprising generating, based on signals received from each sensing electrode, a capacitance signal indicative of a capacitance of the sensing electrode;
the method further comprising determining a location at which pressure is applied to the touch panel based on the capacitance signals.

14. A method according to claim 13, wherein generating the first pressure signals and the capacitance signals comprises separating single signals received from the sensing electrodes.

* * * * *